United States Patent
Wycoff et al.

(10) Patent No.: US 12,461,932 B1
(45) Date of Patent: Nov. 4, 2025

(54) METHOD AND SYSTEM FOR TRANSFORMING DATA USING ARTIFICIAL INTELLIGENCE TO GENERATE CONTENT

(71) Applicant: www.ai.law Corp, Dublin, OH (US)

(72) Inventors: Christopher Wycoff, Palo Alto, CA (US); Troy Doucet, Dublin, OH (US)

( * ) Notice: Subject to any disclaimer, the term of this patent is extended or adjusted under 35 U.S.C. 154(b) by 0 days.

(21) Appl. No.: 18/927,575

(22) Filed: Oct. 25, 2024

(51) Int. Cl.
  *G06F 16/00* (2019.01)
  *G06F 16/248* (2019.01)
  *G06F 16/25* (2019.01)

(52) U.S. Cl.
  CPC .......... *G06F 16/258* (2019.01); *G06F 16/248* (2019.01)

(58) Field of Classification Search
  CPC .... G06F 16/254; G06F 16/116; G06F 16/168; G06F 16/84
  IPC ....................................................... G06F 16/00
  See application file for complete search history.

(56) References Cited

U.S. PATENT DOCUMENTS

| | | | |
|---|---|---|---|
| 12,008,332 B1* | 6/2024 | Gardner | G06F 16/345 |
| 12,093,300 B1* | 9/2024 | Zhou | G06F 40/186 |
| 2021/0365306 A1* | 11/2021 | Haldar | G06F 16/9024 |
| 2024/0330742 A1* | 10/2024 | Hunn | G06N 20/00 |
| 2024/0386185 A1* | 11/2024 | Munoz | G06F 40/103 |
| 2024/0394444 A1* | 11/2024 | Swanson | G06F 40/20 |
| 2025/0086171 A1* | 3/2025 | Kunz | G06F 40/40 |
| 2025/0094690 A1* | 3/2025 | DeCharms | G06N 20/00 |
| 2025/0094825 A1* | 3/2025 | Yu | G06N 3/045 |

* cited by examiner

*Primary Examiner* — Michelle N Owyang

(57) ABSTRACT

In one embodiment, a computer-implemented method may include receiving unstructured input data and transforming the unstructured input data into structured data. The transforming may be performed using a large language model and a parsing algorithm configured for the unstructured input data. The method may include generating, based on the structured data, one or more outputs configured to be processed by an artificial intelligence engine. The method may include generating, using the artificial intelligence engine, a document by converting the one or more outputs from a first format to a second format. The artificial intelligence engine may be configured to generate the document by executing a plurality of functions in parallel to reduce execution time of a processing device. The method may include providing the document to a computing device for presentation on a user interface of the computing device.

20 Claims, 17 Drawing Sheets

RESPOND TO DISCOVERY ○
TRANSFORM OPPOSING COUNCEL'S REQUESTS INTO INSTANT RESPONSES

[ DOWNLOAD ] [ RESET ]

*GENERAL OBJECTIONS*

GENERAL OBJECTIONS

ABC HOLDINGS ('DEPENDANT') HEREBY SUBMITS ITS RESPONSES TO THE PLAINTIFF XYZ DEVELOPMENT CORP'S ("PLAINTIFF") FIRST SET OF INTERROGATIONS, REQUESTS FOR ADMISSIONS, AND REQUESTS FOR PRODUCTION OF DOCUMENTS. THESE RESPONSE ARE BASED UPON THE INFORMATION PRESENTLY AVAILABLE TO DEFENDANT AND ITS COUNSEL. FOLLOWING A REASONABLE INVESTIGATION. DEFENDANT RESERVES THE RIGHT TO AMEND OR SUPPLEMENT THESE RESPONSES AS FURTHER INFORMATION BECOMES AVAILABLE THROUGH ONGOING DISCOVERY OR FURTHER INVESTIGATIONS.

DEFENDANT OBJECTS GENERALLY TO THE PLAINTIFF'S DISCOVERY REQUESTS ON THE FOLLOWING GROUNDS, WITHOUT WAIVING ANY SPECIFIC OBJECTIONS TO INDIVIDUAL INTERROGATIONS, REQUESTS FOR ADMISSIONS, OR REQUESTS FOR PRODUCTION OF DOCUMENTS.

1. "" SCOPE AND RELEVANCE"". DEFENDANT OBJECTS TO ALL DISCOVERY REQUESTS TO THE EXTENT THAT THEY SEE INFORMATION OR DOCUMENTS THAT ARE NOT RELEVANT TO ANY PARTY'S CLAIM OR DEFENSE AND ARE NOT REASONABLY CALCULATED TO LEAD TO THE DISCOVERY OF ADMISSIBLE EVIDENCE. WHERE OBJECTIONS ARE MADE BASED ON RELEVANCE, SUCH OBJECTIONS ARE NOT AN ADMISSION THAT ANY RESPONSE OR DOCUMENT EXITS.

2. ""OVERBREACH AND UNDUE BURDEN"". DEFENDANT OBJECTS TO ANY DISCOVERY REQUESTS THAT ARE OVERLY BROAD OR UNDULY BURDENSOME. DEFENDANT OBJECTS TO REQUESTS THAT REQUIRE AN INORDINATE EXPENDITURE OF TIME OR RESOURCES DISPROPORTIONATE TO THE NATURE OF THIS CASE OR THE INFORMATION SOUGHT

3. ""VAGUENESS AND AMBIGUITY"". DEFENDANT OBJECTS TO ANY DISCOVERY REQUESTS THAT ARE VAGUE OR AMBIGUOUS. DEFENDANT RESERVES THE RIGHT TO REQUEST CLARIFICATION OF ANY REQUEST BEFORE ISSUING A RESPONSE, WHERE THE VAGUENESS OR AMBIGUITY OF THE REQUEST IMPEDES DEPENDENT'S ABILITY TO RESPOND ACCURATELY

FIG. 8

| ******** ***** ⌄ | ** ** **** ⌄ |

| DESIGN YOUR CONTRACT | EDIT YOUR CONTRACT | ⬇ DOWNLOAD | ↻ RESET |

IDENTIFICATION OF PARTIES

IDENTIFICATION OF THE PARTIES TO THIS AGREEMENT

THE UNDERSIGNED ENTITIES ARE HEREBY RECOGNIZED AS THE PARTIES TO THIS AGREEMENT:

FIRSTLY, ABC HOLDINGS INC, A CORPORATION THAT IS DULY INCORPORATED AND VALIDLY EXISTING UNDER THE LAWS OF THE STATE OF ILLINOIS, WITH ITS PRINCIPAL BUSINESS ACTIVITIES ENCOMPASSING THE PROCUREMENT OF VARIOUS REAL ESTATE PROPERTIES THOUGH LIQUIDATION SALES, IS HEREAFTER DESIGNATED AS THE "SELLER"

SECONDLY, XYZ DEVELOPMENT CORP, A CORPORATION PROPERLY ESTABLISHED AND EXISTING IN GOOD STANDING PURSUANT TO THE LAWS OF THE STATE OF ILLINOIS, WITH ITS MAIN BUSINESS ENDEAVORS FOCUSED ON REAL ESTATE DEVELOPMENT, IS HEREAFTER DESIGNATED AS THE "BUYER"

THE AFOREMENTIONED ENTITIES MAY BE REFERRED TO INDIVIDUALLY AS A "PARTY" AND COLLECTIVELY AS THE "PARTIES". THE PARTIES HEREBY AFFIRM THEIR RESPECTIVE LEGAL STATUSES AND EXPRESS THEIR MUTUAL CONSENT TO PARTICIPATE IN THE TRANSACTION AS STIPULATED WITHIN THE TERMS OF THIS AGREEMENT.

************************

DESCRIPTION OF PROPERTY

THE PROPERTY, AS REFERRED TO WITHIN THIS CONTRACT, CONSISTS OF A VACANT PARCEL OF LAND, THE SPECIFIC GEOGRAPHICAL LOCATION OF WHICH IS SITUATED WITHIN THE JURISDICTION OF THE STATE OF ILLINOIS, THE PROPERTY IS CURRENTLY HELD BY THE SELLER, ABC HOLDINGS INC,. AND WAS PREVIOUSLY UTILIZED FOR COMMERCIAL PURPOSES, HOSTING A STRIP MALL AND A DRY CLEANING BUSINESS, WHICH WERE SUBSEQUENTLY DEMOLISHED ABOUT A DECADE AGO. THE EXACT LOCATION, SIZE, BOUNDARIES, AND OTHER PERTINENT DETAILS OF THE PROPERTY WILL BE AS ON THE LEGAL DESCRIPTION PROVIDED IN EXHIBIT A ATTACHED PARTIES. THE PROPERTY IS TO BE

FIG. 11

METHOD AND SYSTEM FOR TRANSFORMING DATA USING ARTIFICIAL INTELLIGENCE TO GENERATE CONTENT

TECHNICAL FIELD

This disclosure relates to content generation. More specifically, this disclosure relates to methods and systems for transforming data using artificial intelligence to generate content (e.g., documents, videos, audio, etc.).

BACKGROUND

Content (e.g., documents, videos, audio, etc.) is conventionally displayed and/or played via a computing device, such as a smartphone, laptop computer, desktop computer, television, or the like. Generating the content may include performing research and spending countless hours drafting a document. For example, a litigation drafting process may take an excessive amount of time to perform the research and draft a lawsuit and/or answer to a lawsuit. Moreover, the research performed may be inaccurate and/or off target for a particular issue and/or claim. Accordingly, conventional content generation may be inaccurate, time-consuming, inefficient, and resource-wasteful.

SUMMARY

In one embodiment, a computer-implemented method may include receiving unstructured input data and transforming the unstructured input data into structured data. The transforming may be performed using a large language model and a parsing algorithm configured for the unstructured input data. The method may include generating, based on the structured data, one or more outputs configured to be processed by an artificial intelligence engine. The method may include generating, using the artificial intelligence engine, a document by converting the one or more outputs from a first format to a second format. The artificial intelligence engine may be configured to generate the document by executing a plurality of functions in parallel to reduce execution time of a processing device. The method may include providing the document to a computing device for presentation on a user interface of the computing device.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 8 illustrates a user interface including an example discovery response according to certain embodiments of this disclosure;

FIG. 11 illustrates a user interface including an example generated contract according to certain embodiments of this disclosure;

NOTATION AND NOMENCLATURE

Figure 1:
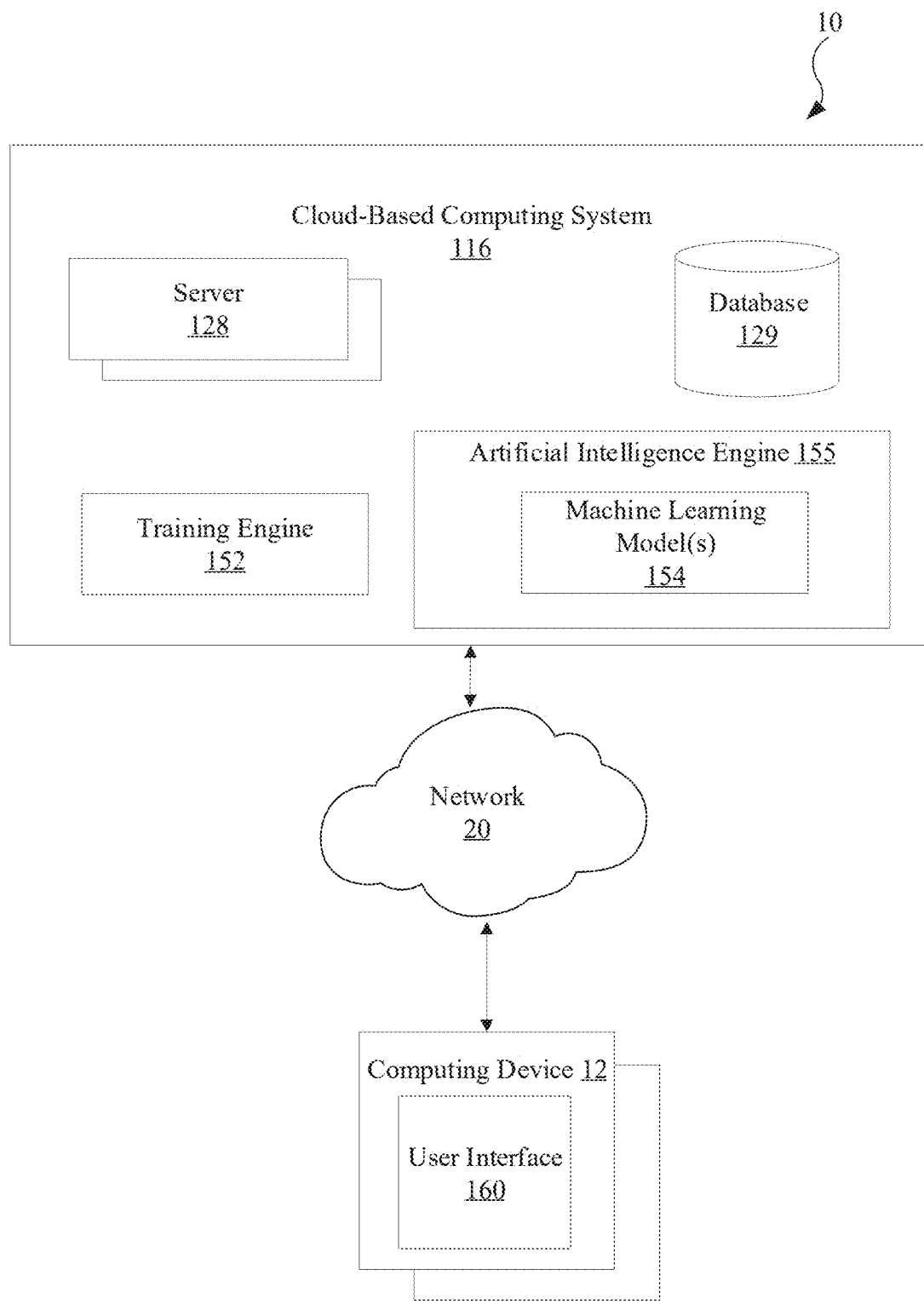
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 17, discussed below, and the various embodiments used to describe the principles of this disclosure in this patent document are by way of illustration only and should not be construed in any way to limit the scope of the disclosure.

Conventional content generation, such as legal documents, do not generate certain pleadings and other documents. Moreover, a technical problem exists as to how to transform unstructured data into structured data that is configured to be processed by an artificial intelligence engine (e.g., that executes one or more machine learning models, neural networks, Bayesian prediction models, large language models, etc.) efficiently, accurately, and in a manner that reduces consumption of computing resources (e.g., processing resources, memory resources, network resources, etc.).

Some of the disclosed techniques may provide technical solutions to the above-referenced technical problems. For example, the disclosed techniques may enable transformation of unstructured data to structured data using trained large language models. Further, the disclosed techniques may provide a technical solution by executing numerous operations simultaneously using enhanced artificial intelligence techniques to reduce resource consumption and improve the functioning of a computer. Also, the disclosed techniques may use artificial intelligence to enhance the efficiency of content generation, such as legal document generation, by the thousands of percent. The disclosed techniques may autonomously manage litigation from start to finish from drafting to case and event management.

In some embodiments, the disclose techniques may enhance efficiency of legal research and document preparation workflows by allowing the input of multiple unstructured inputs (e.g., explanations, related documents, instructions, etc.) and transforming the multiple inputs into structured data, and then using the structured data to generate new, high-quality, formatted legal documents, for example. In some embodiments, the system may be designed to provide insights and provide strategic advice to users of the software.

In some embodiments, the software may be implemented in computer instructions stored on one or more memory devices and executed by one or more processing devices. The software may perform numerous operations, functions, and/or processes. For example, the software may (i) transform unstructured data into structured data, (ii) using the structured data to obtain output configured to be used by an artificial intelligence engine while significantly increasing speed, (iii) generating, using the output and an artificial intelligence engine, a formatted document, (iv) resolving challenges of generating long (dozens of pages), cohesive documents using artificial intelligence, (v) resolving common shortfalls of retrieval augment generation searches that misses information by creating a deep and comprehensive information retrieval process to identify every occurrence related to a specific query, then using a feedback loop to manage redundancy and to build a comprehensive results set, (vi) execute an artificially intelligent virtual chat agent that is context-aware and that maintains coherence throughout long and complex legal discussions, and (vii) provides specific tools for overviews, complaints, answers, discovery responses, transcript analysis, document cloning, among other things.

In some embodiments, the software may operate through a user-friendly, browser-based interface or a stand-alone application-based interface that enhances how legal documents are generated and/or managed. The software may enable users to input various types of legal data, from basic case facts to complex legal precedents, and utilizes advanced artificial intelligence techniques to process and transform the data into actionable legal documents. Some embodiments may enable document generation, insight extraction, recommendation generation, search capabilities across uploaded document corpora, among other things.

In some embodiments, the software may include a suite of large language model input strategies that are used directly by users and/or within a document generation system and customized artificial intelligent driven legal drafting feature described herein. The software may include tools and/or features such as a "lawsuit analyzer" and "identify claims & boost damages tool," which utilize an artificial intelligence engine to analyze legal data and provide predictions on case outcomes and potential damages. These tools and/or features may use historical data and current legal standards to offer strategic advice, making them invaluable for legal decision-making.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop computer, tablet, smartphone, wearable, or desktop computer. The computing devices 12 may execute an application that includes a display capable of presenting a user interface 160 of an application. The application may be implemented in computer instructions stored on the one or more memory devices of the computing devices 12 and executable by the one or more processing devices of the computing device 12. The application may be hosted as a website in a web browser on the computing device or the application may be a stand-alone application installed on the computing device 12. The application may present various screens to a user. For example, the user interface 160 may present a client and matter management screen, an artificially intelligent virtual chat agent screen, a lawsuit complaint drafting screen, a lawsuit answer drafting screen, a discovery response drafting screen, editing screens, a transcript summarizing screen, a contract drafting screen, among many other screens.

The computing devices 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence engine 155 that uses one or more machine learning models 154 to perform at least one of the embodiments disclosed herein. The one or more machine learning models 154 may be large language models that are used to perform at least one of the embodiments disclosed herein. Large language models are a type of deep learning model that use large amounts of training data to analyze and understand natural language. The large language models may be trained with legal resources (e.g., laws, statutes, cases, etc.).

The artificial intelligence engine 155 may execute other types of artificial intelligence, such as expert systems, deep learning models, neural networks, and the like. The artificial intelligence engine 155 may be implemented in instructions stored on one or more memory devices and executed by one or more processing devices of the cloud-based computing system 116. The cloud-based computing system 116 may also include a database 129 that stores data, knowledge, and data structures used to perform various embodiments. For example, the database 129 may store the a history of generated lawsuit complaints, lawsuit answers, discovery responses, transcripts, conversations between a user and an artificially intelligent virtual chat agent, legal resources, contracts, templates, user profiles, user preferences, and the like. In some embodiments, the database 129 may be hosted on one or more of the servers 128.

In some embodiments, the cloud-based computing system 116 may include a training engine 152 capable of generating the one or more machine learning models 154. The machine learning models 154 may be trained to analyze unstructured data and transform the unstructured data to structured date, generate lawsuit complaints, generate lawsuit answers, generate discovery responses, generate contracts, generate transcript summaries, analyze legal content, duplicate documents, among other things described herein. Any of the large language models described herein may be one of the machine learning models 154 that are generated and trained by the training engine 152 to perform the tasks described herein. The one or more machine learning models 154 may be generated by the training engine 152 and may be implemented in computer instructions executable by one or more processing devices of the training engine 152 and/or the servers 128 of the cloud-based computing system 116. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of inputs (facts, claims, party names, legal precedent, explanations, related documents, instructions, unstructured data, defendant, plaintiff, judge, jurisdiction, causes of action, contract type, user input, etc.) mapped to labeled outputs (legal documents such as complaints, answers, discovery responses, contracts, transcripts, duplicate documents, etc.).

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive an uploaded document with information related to a lawsuit (party names, claims, etc.), determine a similar lawsuit complaint based on the information, and generate a lawsuit complaint document accordingly. Although depicted separately from the server 128, in some embodiments, the training engine 152 may reside on server 128. Further, in some embodiments, the database 129, and/or the training engine 152 may reside on the computing devices 12.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons. In some embodiments, the one or more machine learning models 154 may comprise large language models. The large language model may involve deep learning in order to understand how characters, words, and sentences function together. Deep learning involves probabilistic analysis of unstructured data, which eventually enables the deep learning model to recognize distinctions between pieces of content (e.g., words, sentences, paragraphs, documents, etc.).

Figure 2:
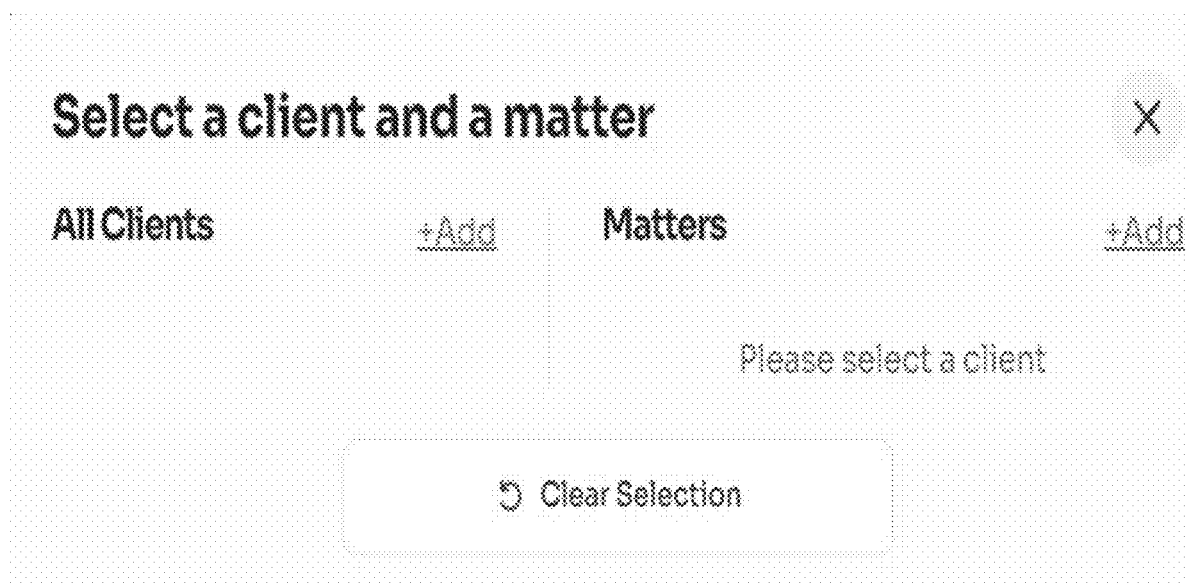
FIG. 2 illustrates a user interface including a client and matter management tool according to certain embodiments of this disclosure.

FIG. 2 illustrates a user interface including a client and matter management tool according to certain embodiments of this disclosure. As depicted, the client and matter management tool is presented on a user interface and enables the user to add a client to the client list and add a matter associated with that client. All clients and their associated matters may be managed by this tool.

Figure 3:
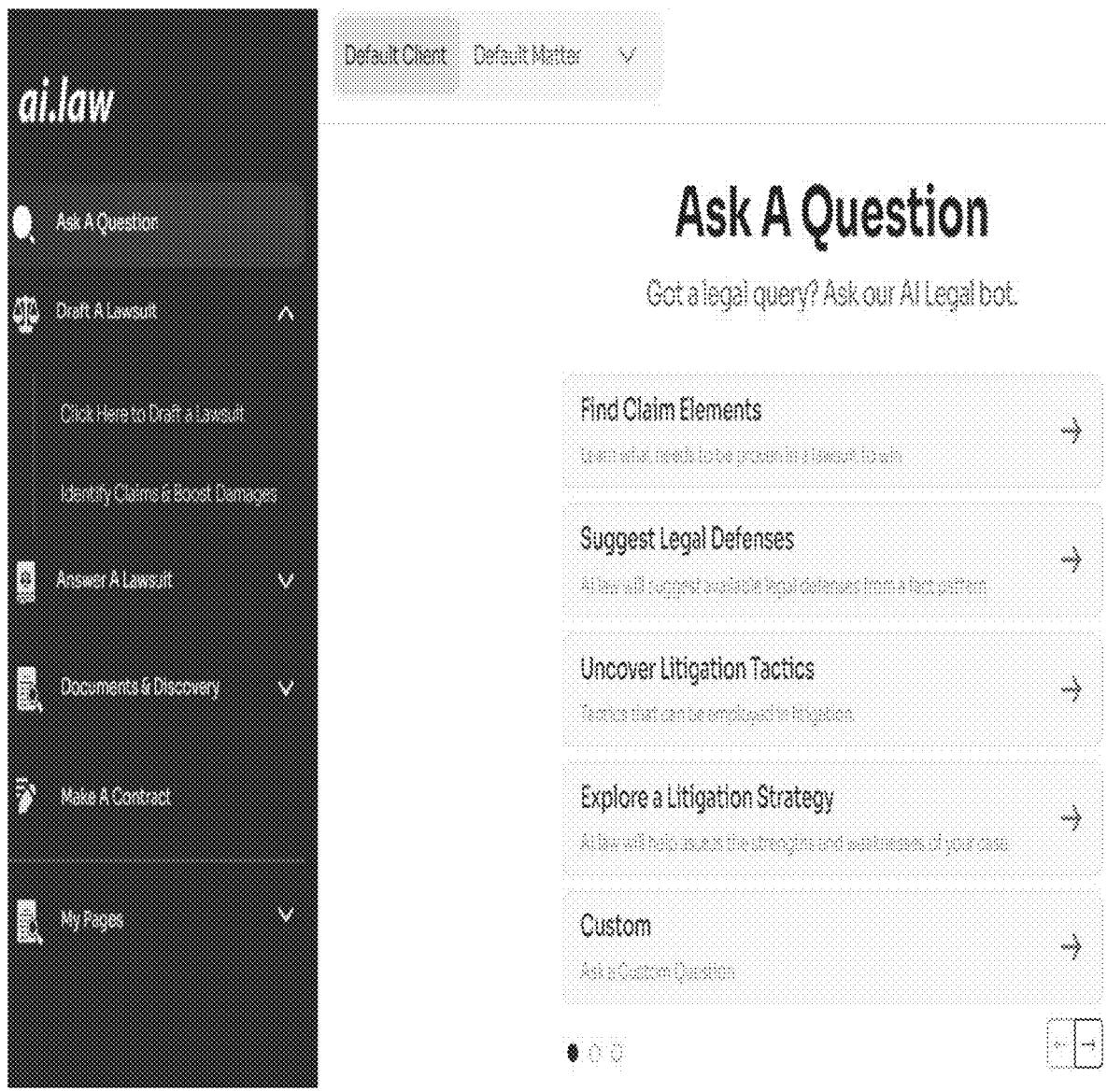
FIG. 3 illustrates a user interface including an artificially intelligent virtual chat agent according to certain embodiments of this disclosure.

FIG. 3 illustrates a user interface including an artificially intelligent virtual chat agent according to certain embodiments of this disclosure. The artificially intelligent virtual chat agent may enable a user to use natural language to ask any desired question. the artificially intelligent virtual chat agent may provide various topics the user can select such as "Find Claim Elements," "Suggest Legal Defenses," "Uncover Litigation Tactics," "Explore a Litigation Strategy," "Custom," and more.

Figure 4:
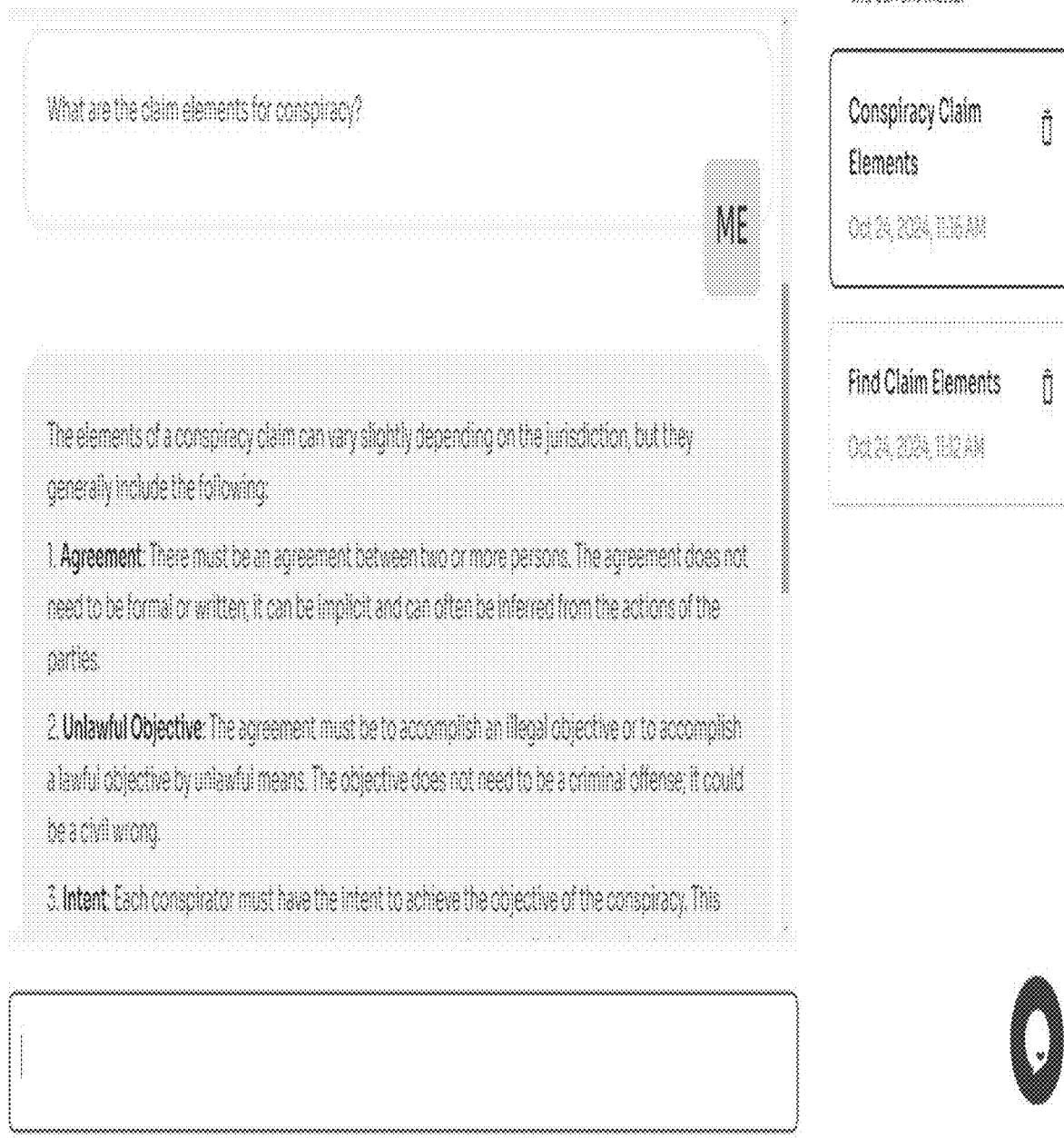
FIG. 4 illustrates a user interface including an automatically generated response to a query using an artificially intelligent virtual chat agent according to certain embodiments of this disclosure.

FIG. 4 illustrates a user interface including an automatically generated response to a query using an artificially intelligent virtual chat agent according to certain embodiments of this disclosure. As depicted, a user asked "What are the claim elements of conspiracy?" The artificially intelligent virtual chat agent parsed the query and generated a dynamic response that identifies each claim element of conspiracy in real-time or near real-time.

Figure 5:
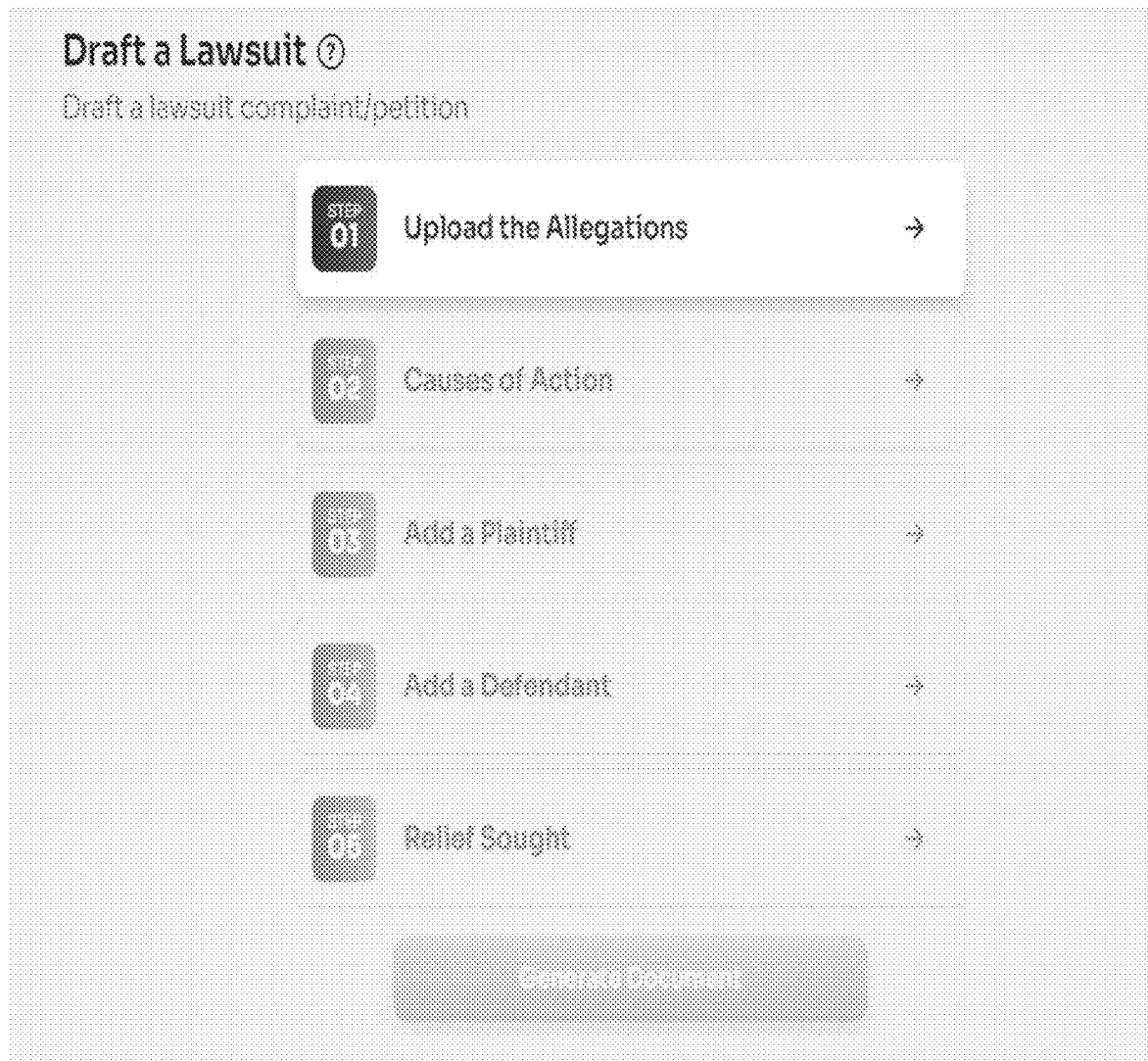
FIG. 5 illustrates a user interface including a lawsuit generating tool implemented using an artificial intelligent engine according to certain embodiments of this disclosure.

FIG. 5 illustrates a user interface including a lawsuit generating tool implemented using an artificial intelligent engine according to certain embodiments of this disclosure. Some features of the lawsuit generating tool may include uploading allegations, causes of action, adding a plaintiff, adding a defendant, and relief sought.

In some embodiments, the lawsuit generating tool implemented using the artificial intelligent engine may convert extensive drafting into a streamlined, automated process that drafts comprehensive lawsuit complaints. Users may input or upload specific case details, such as party names, facts, and claims via the software's user interface. The input to the software may be an unstructured document or string referred to as "allegation information." The allegation information may be input into an unstructured to structured data conversion via refiner step and model-level function call parsing implemented by the artificial intelligence engine 155 described herein. The cloud-based computing system 116 may automatically draft a complete complaint that incorporates necessary legal components, ready for review and submission within minutes.

In some embodiments, the disclosed techniques may enable the ability to generate numerous (e.g., dozens) claims (causes of action) for a complaint based solely on the user identifying the name of the claim. The artificial intelligent engine may identify the elements of each claim from the user's stated jurisdiction, and then using the facts imputed by user to properly allege factual allegations for each claim element to properly plead the claim. Formatting entire lawsuit complaint that includes the: (i) court/party heading, (ii) name of document, (iii) jury demand, (iv) persuasively written introductory statement based on a formula (plaintiff's innocence, defendant's misgivings, notice to defendant injury would occur, and defendant's repetitious bad behavior) to highlight the emotional need for plaintiff to win, (v) general allegations section presented in chronological order outlining the story of the plaintiff, (vi) claims/causes of action each written under its own heading that pulls facts into each element of each claim, (vii) an integration clause at the start of each claim, (viii) a demand section preformatted and customized to users' facts, (ix) closing jury demand and signature section for plaintiff/plaintiff(s) counsel, or (x) some combination thereof.

In some embodiments, the artificial intelligence engine may concurrently execute the claim generating function, the element identification function, alleging factual allegations function for each claim, and/or formatting the entire lawsuit function to speed up delivery of the document. The properly pled complaint document may be transmitted for presentation on a user interface of a computing device of a user.

In some embodiments, and as described further herein, the allegation information being input into the unstructured to structured data conversion via refiner step and model-level function call parsing executed by the artificial intelligent engine 155 that results in programmatic access to the following strings: (i) current claim: the specific legal claim being addressed in this section of the complaint, (ii) jurisdiction: the legal jurisdiction (e.g., state or federal court) where the case is being filed, (iii) client: information about the client(s) bringing the lawsuit, (iv) relief: the desired outcome or remedy the client is seeking from the lawsuit, (v) issue description: a detailed description of the facts, events, and circumstances relevant to the case, (vi) sympathetic facts: facts that portray the client in a favorable light or highlight their vulnerability, (vii) contentious issues: aspects of the case likely to be disputed or challenged by the opposing party, (viii) misgivings: information about the opposing party that suggests misconduct or bad faith, (ix) special instructions: any specific guidelines or requirements for drafting the complaint, (x) general allegations: broad factual statements that apply to multiple claims in the complaint. Additionally an array of strings representing each individual cause of action may be extracted from the input.

In some embodiments, these programmatically accessible variables (strings) may be used strategically to create custom prompts for the following sections: (i) title section, (ii) heading section, (iii) introduction section, (iv) jurisdiction section, (v) parties section, (vi) general allegations section, (vii) conclusion section, (viii) claims section (one section per claim, also known as cause of action). These sections may be generated individually by large language models with prompt input containing the programmatically accessible variables.

In some embodiments, the sections generated may be recombined in the order: (i) heading, (ii) title, (iii) introduction, (iv) jurisdiction, (v) parties, (vi) general allegations, (vii) claims (first concatenated together as they are each separately generated), and (viii) conclusion. In some embodiments, this draft string may be run though the software's context-aware feedback loop described further herein, which may remove redundancies and collate the overall strategy of the document. The output of the context-aware feedback loop may be provided to the software's conversion of language model out put to formatted document feature executed by the artificial intelligence engine 155 (as described further herein) to translate the output to a formatted rendered complaint document.

Figure 6:
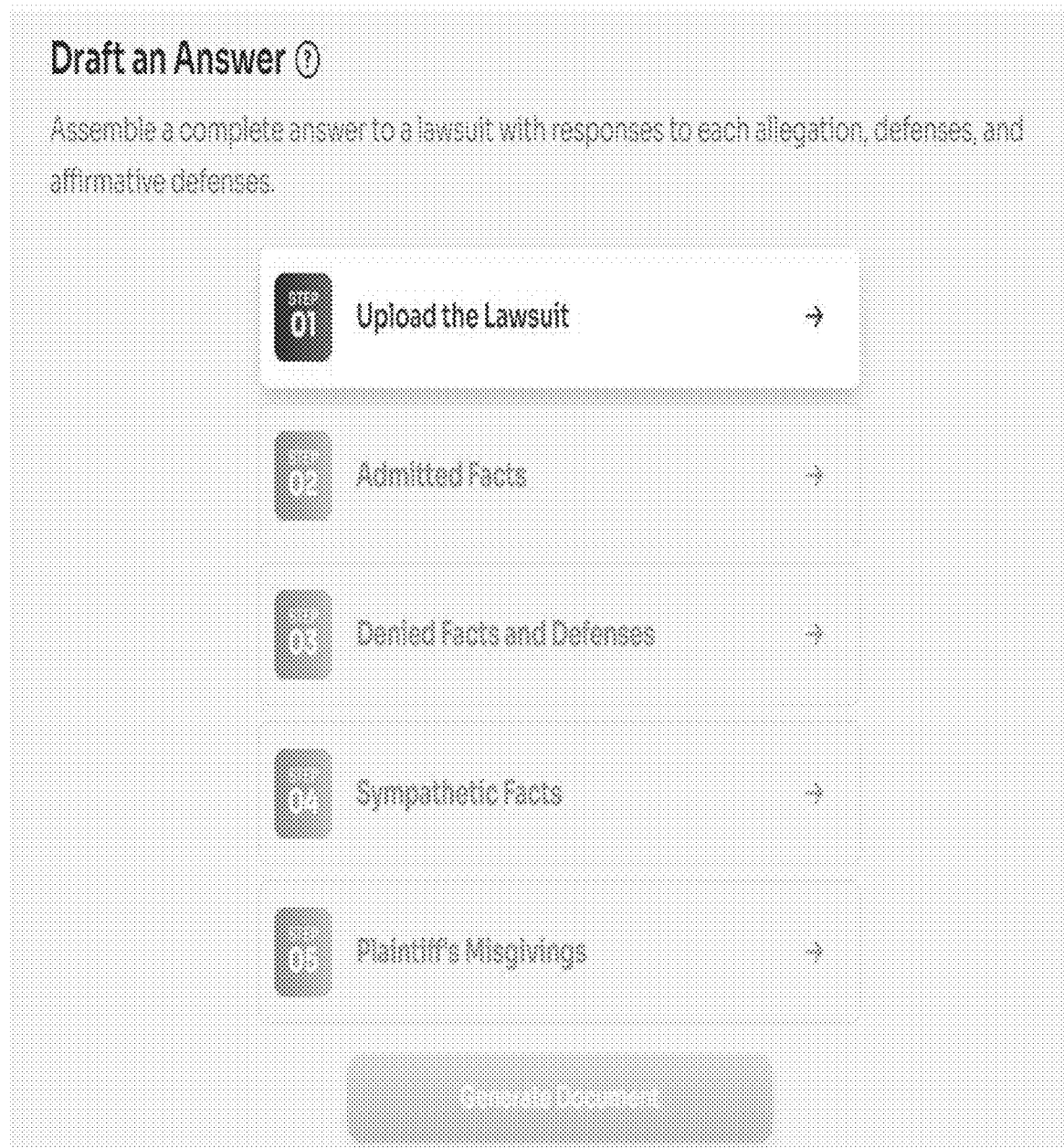
FIG. 6 illustrates a user interface including a lawsuit answer generating tool implemented using an artificial intelligent engine according to certain embodiments of this disclosure.

FIG. 6 illustrates a user interface including a lawsuit answer generating tool implemented using an artificial intelligent engine 155 according to certain embodiments of this disclosure. Some features of the lawsuit answer generating tool may include uploading a lawsuit, adding admitted facts, adding denied facts and defenses, adding sympathetic facts, and adding plaintiff's misgivings.

In some embodiments, the artificial intelligence engine may be used by the cloud-based computing system 116 to automatically draft answers to complaints by addressing each allegation with precision and integrating legal defenses based on the context provided. For example, attorneys or users may use the user interface 160 to enter or upload details of the received complaint, and the cloud-based computing system 116 may execute the artificial intelligence engine 155 to generate a tailored answer document, incorporating necessary defenses and responding to each allegation, which ensures compliance and precision.

The cloud-based computing system 116 may be executed to generate an answer denying allegations appropriately for a complaint based solely on the user uploading the complaint. In some embodiments, the software may be executed to generate an answer that that appropriately responds to each allegation in the complaint by parsing each paragraph allegation in the complaint into its separate and distinct parts, and then responding appropriately to each part based on the facts entered by the user. Further, the software may be executed to recognize the nature of the complaint's claims and then include defenses and affirmative defenses generally raised for that type of claim. In some embodiments, the software may recognize defensive doctrines from the fact pattern entered by the user and include those identified defenses as defenses and affirmative defenses as appropriate.

In some embodiments, the artificial intelligence engine 116 implemented by the software may be used to generate an entire formatted answer to the complaint. The formatted answer may include (i) court/party heading, (ii) name of document, (iii) jury demand, (iv) persuasively written introductory statement based on a formula to highlight the plaintiff's misgivings and defendant(s) positives to present an emotionally compelling defense, (v) a response appropriate to each allegation, (vi) relevant defenses and affirmative defenses, (vii) an integration clause at the start of each claim, (viii) a demand section preformatted and customized to users' facts pulling those normally alleged with the type of lawsuit presented and custom by identifying defensive doctrines from facts presented, (ix) a closing jury demand and signature section for defendants(s) counsel, (x) the inclusion of a certificate of service with the plaintiff's counsels contact information entered from the complaint (or the pro se litigants information if no counsel provided), or (xi) some combination thereof.

The artificial intelligence engine 116 may execute each function for generating the answer concurrently to enhance the speed of delivery of the document. The artificial intelligence engine 116 may consume hundreds of pages of factual information provided by the user for the responses to each allegation. In some embodiments, the artificial intelligence engine 116 may providing a properly pled and formatted answer that can span dozens of pages. Further, the software may provide, via the user interface 160, a history section where prior runs (answers generated with certain uploaded or entered information) can be recalled and run again.

To provide further detail, the input to the software may include (i) a legal complaint/lawsuit/petition, and (ii) facts about the case. The complaint and facts about the case may be input into the unstructured to structured data conversion via refiner step and model-level function call parsing executed by the artificial intelligence engine 155 as described further herein. This process may result in programmatic access to the following strings: (i) name of defendants, (ii) admitted allegations, (iii) facts supporting defenses, (iv) plaintiffs misgivings, (v) why plaintiff should lose, (vi) defendant for caption, (vii) plaintiff for caption, (viii) case number for caption, (ix) court title for caption, (x) court location for caption, (xi) document title for caption, (xii) client role, (xiii) client name, (xiv) opposing party name, (xv) responding party lawyer, and (xvi) serving party lawyer.

These now programmatically accessible variables (strings) may be used strategically to create custom prompts for the following sections: (i) court caption, (ii) introduction, (iii) responses to each allegation (e.g., this process may be generated using the context-aware feedback loop), (iv) defenses, (v) affirmative defenses, (vi) request for relief, (vii) certificate of service.

The sections generated may be recombined in the following order: (i) court caption, (ii) introduction, (iii) responses to each allegation (e.g., this process may be generated using the context-aware feedback loop), (iv) defenses, (v) affirmative defenses, (vi) request for relief, and (vii) certificate of service. The output of the context-aware feedback loop may be provided to the software's conversion of language model output to formatted document feature executed by the artificial intelligence engine 155 to translate the output to a formatted rendered answer document.

Figure 7:
FIG. 7 illustrates a user interface including a discovery response generating tool implemented using an artificial intelligent engine according to certain embodiments of this disclosure.

FIG. 7 illustrates a user interface including a discovery response generating tool implemented using an artificial intelligent engine according to certain embodiments of this disclosure. Some features of the discovery response generating tool may include uploading a discovery document, specifying the case type, identifying the client, adding client responses, among other things.

In some embodiments, the cloud-based computing system 116 may execute the artificial intelligence engine 116 implemented in software to draft complete, comprehensive discovery responses. In some embodiments, the artificial intelligence engine 116 may transform complex discovery requests into organized, legally compliant responses. For example, users may upload discovery requests received from opposing counsel. The software may parse these requests and assist in drafting comprehensive responses that include appropriate legal objections and responses based on the client's data and case facts.

In some embodiments, the cloud-based computing system 116 may enable receiving an uploaded written discovery requests, either by type or in combination (requests for admissions, production of documents, interrogatories, etc.). In some embodiments, the cloud-based computing system 116 may enable the user to upload unstructured responsive information and documents for the artificial intelligence engine 116 to generate responses. The cloud-based computing system 116 may generate general objections for the responsive document. In some embodiments, the artificial intelligence engine 155 may restate each request and may recognize each objection that may be applicable. The artificial intelligence engine 115 may generate a document that drafts the objections in such a way to be comprehensive. The artificial intelligence engine 155 may respond to each request factually using only relevant uploaded factual information provided by the user to respond to that particular request. The responses generated the cloud-based computing system 116 executing the artificial intelligence engine 155 may be presented on the user interface 160, which allows users to edit each response by typing into responses, deleting parts of responses, or using the artificial intelligence engine 155 to redraft/amend each response. Further, the user interface 160 may provide a history section where prior runs can be recalled and run again.

Additional detail regarding the discovery response generation process will now be provided.

In some embodiments, the input to the software may include (i) a request for discovery responses document, (ii) facts about the case, (iii) Responses from the responding party. The input request for discovery responses document may be provided to a hybrid algorithm that combines the context-aware feedback loop and the unstructured to structured data conversion via refiner step and model-level function call parsing executed by the artificial intelligence engine 155.

For example, the context-aware feedback loop may be iterated though but a standard prompt configuration is replaced by the unstructured to structured data conversion via refiner step and model-level function call parsing executed by the artificial intelligence engine 155.

The input to the unstructured to structured data conversion via refiner step and model-level function call parsing executed by the artificial intelligence engine 155 may be the complaint as well as specific instructions to return a JSON with a singular field defined as an array of strings, known as the discovery request string array. This array of strings may be the verbatim requests from the user input request for discovery responses document. The discovery responses document may be a long input thus the output of the unstructured to structured data conversion via refiner step and model-level function call parsing executed by the artificial intelligence engine 155 if called without wrapping with the context-aware feedback loop may result in an error or incomplete output. In some embodiments, a technical solution is provided by the disclosed techniques as described further herein.

In some embodiments, the following sections are generated independently: (i) caption, (ii) general objections, (iii) responses: (a) notably the responses sections are generated in a unique manner using our recursively built output sliding window input language model powered deep search as described further herein, (b) the inputs to the recursively built output sliding window input language model powered deep search may be (1) query: The request associated with the response derived from the index of a discovery request string array associated with the currently generating response, (2) corpus document: The entirety of both the facts about the case and responses from the responding party, (c) the output of step (a) as well as the appropriate string from the discovery request string array may be used as input to a prompt configuration, used to inference a language model to then output the response associated with the prior mentioned request, (d) upon completion of all responses the original requests from the discovery request string array are pre-concatenated to the response generated in step (iii), (e) in the correct order these request and response pairs may be concatenated together to form the full responses section, (iv) certificate of service.

The caption, general objections, full responses section, and certificate of service, may be concatenated together in that order into a string referred to as a full discovery response string. This full discovery response string may be passed through the context-aware feedback loop. The output may be passed through the conversion of language model to formatted document feature executed by the artificial intelligence engine 155 and presented via the user interface 160.

FIG. 8 illustrates a user interface including an example drafted lawsuit according to certain embodiments of this disclosure.

Figure 9:
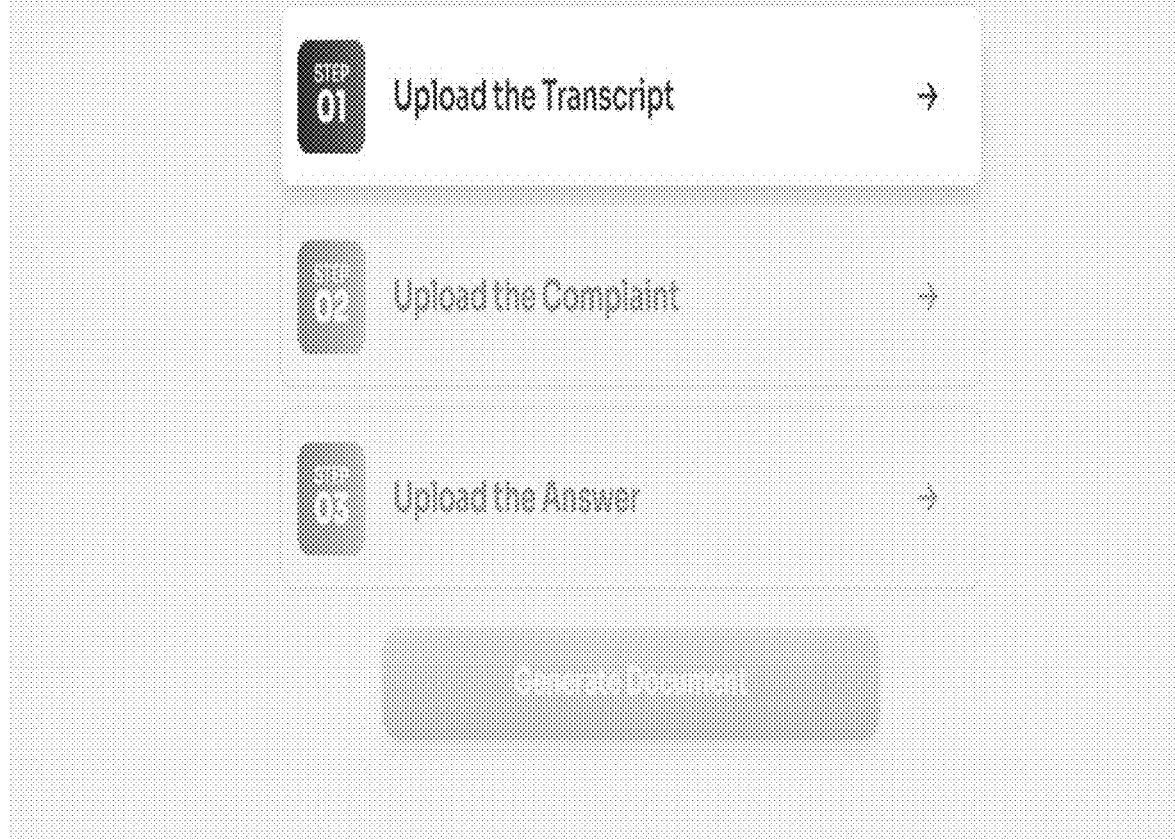
FIG. 9 illustrates a user interface including a transcript summary generating tool implemented using an artificial intelligent engine according to certain embodiments of this disclosure.

FIG. 9 illustrates a user interface including a transcript summary generating tool implemented using an artificial intelligent engine according to certain embodiments of this disclosure. Some features of the transcript summary generating tool may include uploading a transcript, uploading a complaint, and uploading an answer.

In some embodiments, the artificial intelligence engine 155 may be configured to perform transcript report and summarization informed and guided by an associated complaint and answer. The input of this algorithm are as follows: (i) a transcript document or documents, (ii) a complaint document, (iii) an answer document. The inputs may processed via optical character recognition or other document to string conversion. The resulting strings may include (i) transcript string, (ii) complaint string, and (iii) answer string.

In some embodiments, the complaint string may be passed through the unstructured to structured data conversion via refiner step and model-level function call parsing executed by the artificial intelligence engine 155 configured in such a way to result in a JSON object with the field claims an array of claims data objects. The data objects contain the claim name of the claim description of the claim and an array of elements containing element objects that contain an element name and element description. These data objects may be provided to the recursively built output sliding window input language model powered deep search feature implemented by the artificial intelligence engine 155. Each of the elements identified may be passed to the recursively built output sliding window input language model powered deep search feature implemented by the artificial intelligence engine 155 in this case is the request are: (i) query: the element name and element description concatenated together, and (ii) Corpus document: The entirety of the transcript string.

In some embodiments, the result may include a comprehensive search of the entire transcript string where every instance relevant to a particular element of a claim is found. The following sections may additionally be generated using configured prompts and model inference: (i) executive summary, (ii) deponent background, (iii) deponent preparation, (iv) testimony relevant to defense, (v) testimony with inconsistent statements, (vi) further discovery, (vii) further investigation.

In some embodiments, the resulting comprehensive search of the entire transcript string may be injected between outputs (iii) deponent preparation and (iv) testimony relevant to defense and concatenated. The resulting fully concatenated string may be provided through the context-aware feedback loop. The output may be passed through the conversion of language model output to formatted document feature executed by the artificial intelligence engine 155. The resulting document may be presented via the user interface 160.

Figure 10:
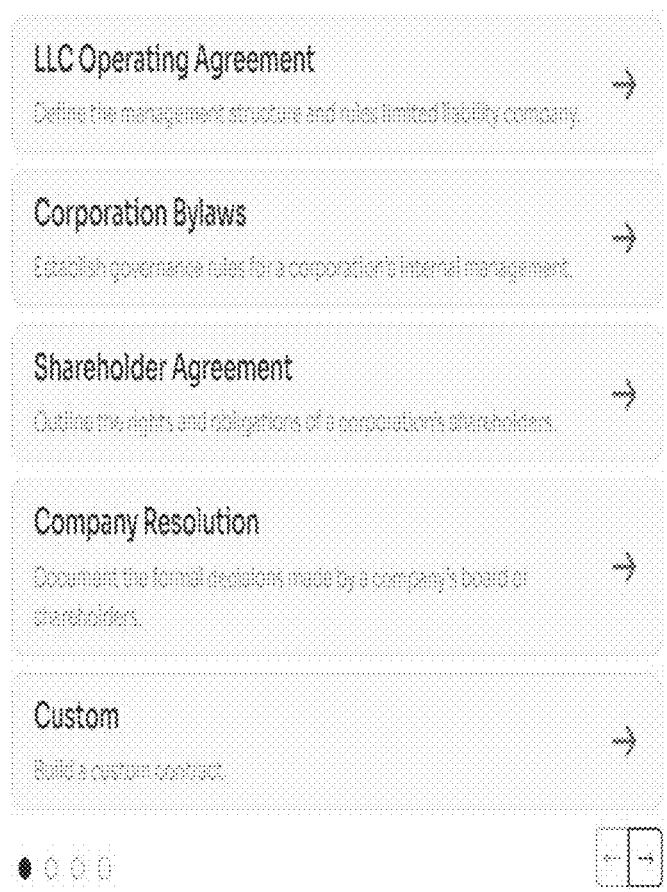
FIG. 10 illustrates a user interface including a contract generating tool implemented using an artificial intelligent engine according to certain embodiments of this disclosure.

FIG. 10 illustrates a user interface including a contract generating tool implemented using an artificial intelligent engine according to certain embodiments of this disclosure. Some features of the contract generating tool may include selecting a type of contract the user desires to be generated, such as a LLC operating agreement, corporation bylaws, shareholder agreement, company resolution, etc.

In some embodiments, the cloud-based computing system 116 may execute the artificial intelligence engine 155 to generate complete contract drafts for a user based on dynamic responses provided by the user to an interactive artificially intelligent virtual chat agent. For example, the disclosed techniques may be used to generate complete contracts from scratch that are relevant and usable for an intended purpose.

In some embodiments, the cloud-based computing system 116 may enable the user to select or state (e.g., via any input peripheral such as keyboard, microphone, touchscreen, mouse, etc.) any type of contract (or use pre-prompted options) and then dynamically chat with the artificially intelligent virtual chat agent so that it can gather relevant facts for the contract that it will draft. The generated contract may be formatted and include (i) parties to contract, (ii) jurisdiction of contract, (iii) substantive terms, (iv) suggestions on specific terms/provisions that are common for this type of contract and a request for the user to provide that information.

In some embodiments, the cloud-based computing system 116 may enable the user to provide substantial amounts of information to be included in the contract. The cloud-based computing system 116 may generate a summary with confirmation of information from the chat before drafting the contract. The user may select to confirm the information or may select to modify the information from the chat with the artificially intelligent virtual chat agent. Once confirmed, the artificial intelligent engine 155 may generate a contract that may span dozens of pages with each paragraph being relevant to the facts provided. In some embodiments, the responses generated may be presented on the user interface 160, which provides an editing screen that allows users to edit each paragraph by typing into responses, deleting parts of paragraphs, adding new paragraphs by simply stating the title, or requesting the artificial intelligence engine 155 to redraft/amend each response. Further, the user interface 160 may provide a history of all prior chats that can be clicked to again edit or re-run with or without additional information.

FIG. 11 illustrates a user interface including an example generated contract according to certain embodiments of this disclosure.

In addition, the cloud-based computing system 116 may provide a medical record summarizer via the user interface 160. In some embodiments, the cloud-based computing system 116 may enable users to upload medical files, doctor records, hospital invoices, a police report, and other relevant documents and then executes the artificial intelligent engine 155 to generate a comprehensive summary with detailed information. For example, the disclosed techniques may be used by legal professionals who work with injury-related claims, such as personal injury lawyers, insurance defense companies, and workers' compensation legal professionals, who need to quickly understand the nature of the injury, its impact on quality of life, and an accurate list of costs and providers In some embodiments, the cloud-based computing system 116 may enable uploading and/or receiving large (e.g., 8 gigabyte) documents and numerous (e.g., 150,000 documents) to be analyzed and processed. In some embodiments, the cloud-based computing system 116 may generate lists of costs and providers from large document sets with complete accuracy. This is a functionality provided by the disclosed techniques that may parse unstructured data into small parts that is then read line-by-line by the artificial intelligence engine 155 in order to extract the data with high accuracy.

The artificial intelligence engine 155 may generate a report that is presented on a user interface 160. The report may be formatted and include information such as (i) primary Injury, (ii) potential causes of the injury, (iii) physical impact, (iv) psychological impact, (v) recovery timeframe, (vi) medical treatments and their effectiveness, (vii) ways injury impacts quality of life, (viii) medically significant events, (ix) summary of opinions or prognostic information, (x) recovery trajectory or permanent limitations, (xi) preexisting conditions or distinct injury, (xii) itemized costs (usually detailed and accurate), such as location/provider, specific item, cost per item, total cost per location, (xiii) medical providers list, such as name, position, employer, employer address, (xiv) potentially missing documents, (xv) arguments for plaintiff, (xvi) arguments for defendant, or (xvii) some combination thereof.

In addition, the cloud-based computing system 116 may provide a transcript summarizer via the user interface 160. The cloud-based computing system 116 may execute the artificial intelligence engine 155 to analyze and summarize lengthy legal transcripts, highlighting key points and critical data. For example, the disclosed techniques may be used by users to upload court and/or deposition transcripts to the software. The software may automatically analyze the content, extracting and summarizing key information which is then presented in a concise report format in the user interface 160, ready for use in case strategy or court presentations.

In some embodiments, the cloud-based computing system 116 may enable the user to upload large documents (e.g., 8 gigabytes) and numerous documents (e.g., 150,000 documents) for the artificial intelligence engine 155 to process. The formatted report may include content assembled by the artificial intelligence engine 155. The content may include (i) executive summary, (ii) key takeaways from the deposition, (iii) witness reliability analysis, (iv) deponent background, (v) deponent preparation, (vi) testimony relevant to the case claims (element by element: witness statements with citations to page/paragraph added under each element), (vii) testimony relevant to defense (witness statements with citations to page/paragraph added under each relevant defense identified by the artificial intelligence engine 155), (viii) testimony with inconsistent statements, (ix) further discovery (ideas for production requests), (x) further investigation (ideas outside of document requests that may help shed light on the claims or defenses), (xi) a history section where prior runs can be recalled and run again, or (xi) some combination thereof.

Figure 12:
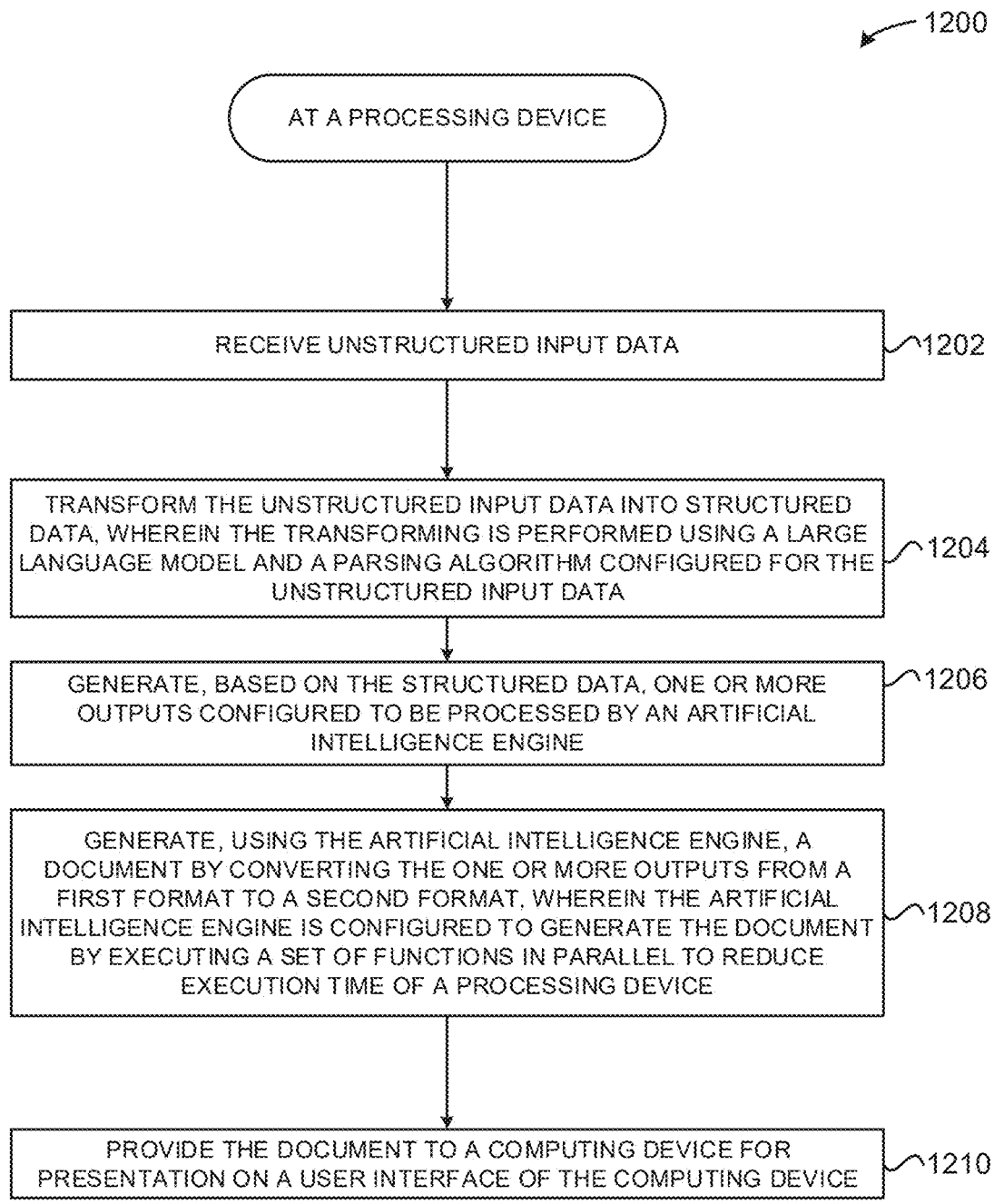
FIG. 12 illustrates an example of a method for transforming unstructured data into structured data and generating a document using artificial intelligence according to certain embodiments of this disclosure.

FIG. 12 illustrates an example of a method 1200 for transforming unstructured data into structured data and generating a document using artificial intelligence according to certain embodiments of this disclosure. The method 1200 may be performed by processing logic that may include hardware (circuitry, dedicated logic, etc.), software, or a combination of both. The method 1200 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1200. The method 1200 may be implemented as computer instructions stored on a memory device and executable by the one or more processors. In certain implementations, the method 1200 may be performed by a single processing thread. Alternatively, the method 1200 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device.

For simplicity of explanation, the method 1200 is depicted and described as a series of operations. However, operations in accordance with this disclosure can occur in various orders or concurrently, and with other operations not presented and described herein. For example, the operations depicted in the method 1200 may occur in combination with any other operation of any other method disclosed herein. Furthermore, not all illustrated operations may be required to implement the method 1200 in accordance with the disclosed subject matter. In addition, those skilled in the art will understand and appreciate that the method 1200 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At block 1202, the processing device may receive unstructured input data.

At block 1204, the processing device may transform the unstructured input data into structured data. The processing device may perform the transformation using a large language model and a parsing algorithm configured for the unstructured input data. The software uniquely transforms unstructured documents into structured and actionable data using sophisticated large language models and parsing algorithms. In some embodiments, the large language models and the parsing algorithms may be tailored specifically for legal content. The large language models and parsing algorithms may be implemented in computer instructions stored on one or more memory devices and executed by one or more processing devices. The large language models and parsing algorithms may be executed as part of the artificial intelligence engine 155 to process complex legal language and extract pertinent information effectively.

In some embodiments, the artificial intelligence engine 155 may define core language model inputs and then are the target of transforming unstructured to structured data. The structured data target may be a series of key value pairs where the key is the known target e.g. 'defendant', 'cause of action', 'provision n' etc. and the value may be the semantic definition in either verbatim or summary from the input text. The input from the user is unstructured data such as a pdf, txt, or docx file. In some embodiments, these files may then be processed though a custom optical character recognition pipeline and processed into a unicode UTF-8 string, for example. Additionally the input documents may be preprocessed and converted to semantic embeddings that are stored associated with the document. The semantic embeddings associated with the document may be used for artificial intelligence enhanced legal insight extraction, as described herein. In some embodiments, the unicode UTF-8 string may be, either separately or in conjunction with other unicode UTF-8 document strings, input to a two-step process that may consistently transform information into a structured form from unstructured text.

This information extraction achieved via the two-step process may include a first step where input is passed through a refiner language model step. The refiner language model step receives the input and an extraction prompt and then outputs the desired output in natural language. The refiner language model may be implemented in computer instructions stored on one or more memory devices and executed by one or more processing devices. To illustrate, a defendant, plaintiff, judge, jurisdiction, and causes of action, in a structured form, are needed to generate a document. An input document contain this information. The input document may be read input into the artificial intelligent engine 155 and an unstructured output of the desired information may be generated by the language model. This refining step may be used for many inputs of large size. The refining step may increase the likelihood of the function call step.

During the second step, the refined unstructured output may be used as input to a specially configured language model. This language model may be implemented in computer instructions stored on one or more memory devices and executed by one or more processing devices. This language model may be configured to perform a function call. This language model may be prompted to output desired information in a certain format (e.g., as an JSON object) intended to be a parameter to a hypothetical function the language model will call. However instead of using the input directly as an explicit function. The software may deserialize the JSON and the output of this function calling model step may result in obtaining the structured data the software uses to complete later generative steps. For example, the defendant, plaintiff, judge, jurisdiction, and causes of action mentioned above have now been identified and output in natural language via the refiner step. This refined text may be passed to a language model that has been directed to output a JSON of a defined schema: {"defendant": "<string>", "plaintiff": "<string>", "judge": "<string>", "jurisdiction": "<jurisdiction string>", "causes of action": ["<string>", . . . ]}. This JSON is then deserialized to an object that can be used programmatically, thus completing the information structuring steps for a given range of desired information. As a result, in some embodiments, the extracted information may exist in a structured state that may be passed predictably and consistently to the series of prompts that exist in the software's generative pipelines of the artificial intelligent engine 155.

At block 1206, the processing device may generate, based on the unstructured data, one or more outputs configured to be processed by an artificial intelligence engine 155. In some embodiments, the processing device may execute a document generation system and perform customized artificial intelligent legal drafting. The software may receive the user input directly or the output of the unstructured to structured data conversion via the refiner step and model-level function call parsing described above and strategically apply it to a series of document section generation functions. These functions may be called either serially or in parallel. The software's parallelization strategy may significantly decrease the runtime of the software by orders of magnitude, thereby reducing the processing resources consumed and providing a technical solution.

In some embodiments, prompts may be created as described herein. A prompt may be defined as, in the context of large language models, a text input provided to the large language model to elicit a specific response, generate content, or perform a task. Some sub definitions may include (i) input format: for example, a string of text, which can range from a single word to multiple paragraphs or even longer documents, (ii) purpose: designed to guide the language models output by providing context, instructions, or a starting point for generation, (iii) structure: can include: a) natural language instructions b) examples (few-shot learning) c) specific formats or templates d) questions or statements to be completed, (iv) task definition: implicitly or explicitly defines the task the large language model is expected to perform, such as answering questions, generating text, or analyzing content, (v) context setting: may include background information or constraints to frame the model's response appropriately, and (vi) interaction element: in multi-turn conversations, each user input serves as a new prompt, building on the conversation history.

In some embodiments, the artificial intelligent engine 155 may execute these prompts either serially or in parallel. The output of the prompts may be either fed back into another structured unstructured to structured data conversion process feature or passed to the document generation system executed by the artificial intelligent engine 155.

These functions may vary by large language model selection, model configuration, and prompt configuration. The artificial intelligent engine's 155 generative functions may be multiphasic including initial steps where inputs are passed through the software's comprehensive legal analysis tools, which are defined herein, in order to gain the appropriate strategy or insight to guide the generation of the current step.

The outputs of the prompts may be recombined strategically and passed though the context-aware feedback loop and then passed through a conversion of language model output to formatted document algorithm executed by the artificial intelligence engine 155. In some embodiments, as mentioned, the disclosed techniques may reduce the amount of time the software executes by using high speed parallel execution of the large language model prompts to speed up generation time of the final document. For example, to achieve this, (i) document sections may be established that are known by the large language model to be able to generate separately, (ii) each section may be associated with a different large language model prompt, (iii) these prompts may be run separately in parallel then concatenated back together once all of the large language model outputs are completed.

At block 1206, the processing device may generate, using the artificial intelligence engine 155, a document by converting the one or more outputs from a first format to a second format. For example, the artificial intelligent engine 155 may convert the large language model output to a formatted document. In some embodiments, the document may include a legal document, a report document, a letter document, a certificate document, or the like. In some embodiments, the document may include a legal complaint, a legal answer, a discovery response, a summary of a transcript, a summary of a medical record, a cloned document, or the like. In some embodiments, the document may be generated without user interaction.

In some embodiments, the artificial intelligent engine 155 may receive a rough draft of a document in a large language model prompt that is prompted to output in a markup. In some embodiments, the heuristics of the markup language may be known and a series of regular expression functions, based on the heuristics, may be executed on the large language model output. The output of these functions may be pieces of a document (e.g., docx document) that may be appended to each other achieving a formatted docx from a large language model output.

Directly incorporating large language models outputs into complex document formats poses technical challenges. First, there may be a fundamental format incompatibility: large language models may generate plain text, which lacks rich structural information required by sophisticated document formats. This leads to a second issue of styling inconsistencies, where the resulting document would appear unprofessional and poorly formatted due to the absence of proper styling cues. Finally, complex documents often require specific layout elements such as headers, footers, and multi-column designs, which may not be part of large language models output. These technical challenges underscore the need for an intermediary technical solution that can interpret the large language models content and appropriately structure it for the target document format.

In some embodiments, the disclosed software overcomes these technical challenges by providing the following technical solutions: (i) the configuration of the text generation functions results in output with structural and formatting cues, (ii) an intermediate storage component for holding the generated content, (iii) a conversion module (implemented in computer instructions stored on a memory device and executed by a processing device) is configured to access the content from the intermediate storage, interpret the basic structural and formatting cues, and transform the content into a complex document format.

In some embodiments, the complex document format may support advanced layout features, varied styles, and embedded media elements. The conversion module may apply appropriate styling, formatting, and structure to create a visually enhanced output document. The disclose software may separate content generation from document formatting, enabling efficient creation of professionally formatted documents from artificial intelligently generated content.

In some embodiments, the software may also use an intermediate context-aware feedback loop in order to further improve consistency to the structural and formatting cues mentioned herein. The context-aware feedback loop may be implemented in computer instructions stored on a memory device and executed by a processing device. In instances where the large language model output length constraints present a technical bottleneck the context-aware feedback loop may convert the technical bottleneck to the input length. This may be useful because typically the input length constraint of language models is orders of magnitude greater than output length. Naive document generation using language models may conventionally have a limit of about 4-8 pages, but the disclosed feedback loop system allows for final outputs of over 120-230 pages. Further, in instances where multiple portions of a document have been reintegrated there may be redundant or inconsistent information. The context-aware feedback loop may restore optimal coherence and flow to an output document.

In some embodiments, the cloud-based computing system 116 may execute the artificial intelligence engine 155 that executes the context-aware feedback loop. In some embodiments, a full document string may be initiated. A prompt may be provided to a large language model that is known the large language model may likely stop generating due to output limit constraints. A feature of the provided prompt may be "do not start over keep going where you left off". On the first iteration the prompt structure is now: (i) system message <original system message>, (ii) user message <original user message>. When the large language model finishes outputting, the output is added to the full document string. The software may detect the reason why the large language model stopped. If it stopped due to being finished, then the software stops and the process is complete. If the software detects the reason why the large language model stopped is because the large language model hit its output maximum, then the software runs the large language model again with the same prompt but now the full document string is added to the messages of the prompt. The prompt may now be: (i) system message <original system message>, (ii) user message <original system message>, (iii) assistant message <full document string>. The software may iterate until it hits a stop reason that is of reason "finish" or similar. A result of the disclosed techniques is the ability to write hundreds of pages as the output of a large language model that is fully cohesive and does not use heuristics to stitch back together.

In some embodiments, the generated document may include a lawsuit. In some embodiments, the second format may include (i) a court and party heading, (ii) a name of the document, (iii) a jury demand, (iv) an introductory statement comprising an innocence of the user, a wrongdoing of a defendant, a notice to the defendant that injury would occur, an example of the defendant's repetitive wrongdoing, or some combination thereof, (v) a general allegation section presented in chronological order outlining a story of a user, (vi) one or more claims or causes of action each presented under its own heading that presents respective facts for each element of the one or more claims, (vii) an integration clause at a beginning of each of the one or more claims, (viii) a demand section preformatted and customized to the user's facts, (ix) a closing jury demand and signature section for the user and the user's counsel, or (x) some combination thereof.

In some embodiments, the generated document may include an answer for a lawsuit and the artificial intelligent engine generates the answer based on a complaint, and the second format comprises denying one or more allegations associated with the complaint. Further, in some embodiments, the artificial intelligent engine may parse each paragraph of the one or more allegations into separate and distinct parts, and responds appropriately to each part based on facts, and the artificial intelligent engine may determine defensive doctrines from the facts and includes those defensive doctrines as defenses and affirmative defenses.

In some embodiments, the generated document may include an answer to a lawsuit. The second format may include (i) a court and party heading, (ii) a name of the document, (iii) a jury demand, (iv) an introductory statement comprising an a wrongdoing of a plaintiff, a defendant's positives to present an emotionally compelling defense, or some combination thereof, (v) one or more responses that is appropriate to each allegation, (vi) one or more relevant defenses and affirmative defenses, (vii) an integration clause at a start of each claim, (viii) a demand section preformatted and customized to facts and associating those facts with facts normally alleged with the lawsuit and including defensive doctrines from the facts, (ix) a closing jury demand and signature for defendant's counsel, (x) a certificate of service with the plaintiff's counsels contact information entered by a complaint, or (xi) some combination thereof.

In some embodiments, the generated document may include a discovery response and the artificial intelligent engine may generate the discovery response based on one or more discovery requests, and the second format may include legal objections and responses based on a client's data and case facts. Further, in some embodiments, the artificial intelligent engine may restate, in the discovery response, each of the one or more discovery requests and provides each objection that is applicable, and the artificial intelligent engine may respond, in the discovery response, to each of the one or more requests using factual information. In some embodiments, the processing device may present, or cause to be presented, the discovery respond in a user interface that enables editing the discovery response in real-time or near real-time.

In some embodiments, the generated document may include a summary of a medical record and the unstructured input data may include one or more medical files, doctor records, hospital invoices, a police report, or some combination thereof. In some embodiments, the processing device may generate, using the artificial intelligence engine, one or more lists of costs and providers by parsing the unstructured input data into one or more parts and reading line by line in order to extract data associated with the one or more lists of costs and providers. In some embodiments, the second format may include (i) a primary injury, (ii) one or more potential causes of the primary injury, (iii) a physical impact to a plaintiff, (iv) a psychological impact to the plaintiff, (v) a recovery timeframe for the plaintiff, (vi) one or more medical treatments and their effectiveness, (vii) one or more ways the primary injury impacts a quality of life of the plaintiff, (viii) one or more medically significant events, (ix) a summary of opinions or prognostic information, (x) a recovery trajectory or permanent limitation of the plaintiff, (xi) a preexisting condition or distinct injury of the plaintiff, (xii) itemized costs comprising location and provider, specific item, cost per item, and a total cost per location, (xiii) a medical providers list, (xiv) one or more potentially missing documents, (xv) one or more arguments for the plaintiff, (xvi) one or more arguments for a defendant, or (xvii) some combination thereof.

In some embodiments, the generated document may include a summary of a transcript and the unstructured input data may include a court or deposition transcript. In some embodiments, the processing device may analyze the unstructured input data and extracting and summarizing key information. In some embodiments, the second format may include (i) an executive summary, (ii) one or more key takeaways from a deposition, (iii) a witness reliability analysis, (iv) a deponent background, (v) deponent preparation, (vi) testimony relevant to case claims element by element with witness statements with citations to a page and paragraph added under each element, (vii) testimony relevant to the defense with witness statements with citations to a page and paragraph added under each relevant defense, (viii) testimony with inconsistent statement, (ix) ideas for production requests, (x) ideas for further investigation, or (xi) some combination thereof.

At block 1208, the processing device may provide the document to a computing device for presentation on a user interface of the computing device.

In some embodiments, the processing device may receive a second document, and may generate, via the artificial intelligence engine using the second document as a template, a third document that includes one or more facts from a new matter.

In some embodiments, the processing device may generate, based on the one or more outputs and using the artificial intelligence engine, one or more insights. The insights may include claims per party, user selected/requested information, elements per claim, facts supporting each claim element, whether a complaint is well pled, objections available per discovery request, factual information relevant to claims, timelines of events, costs of medical care and property damage, or some combination thereof.

In some embodiments, the processing device may generate, based on the one or more outputs and using an artificial intelligence engine, one or more recommendations. The recommendations may include available potential state, federal, and regulatory private causes of action, available discovery objections based on requests may be another party, facts to include per claim, timelines, lists of costs and providers, or some combination thereof.

Figure 13:
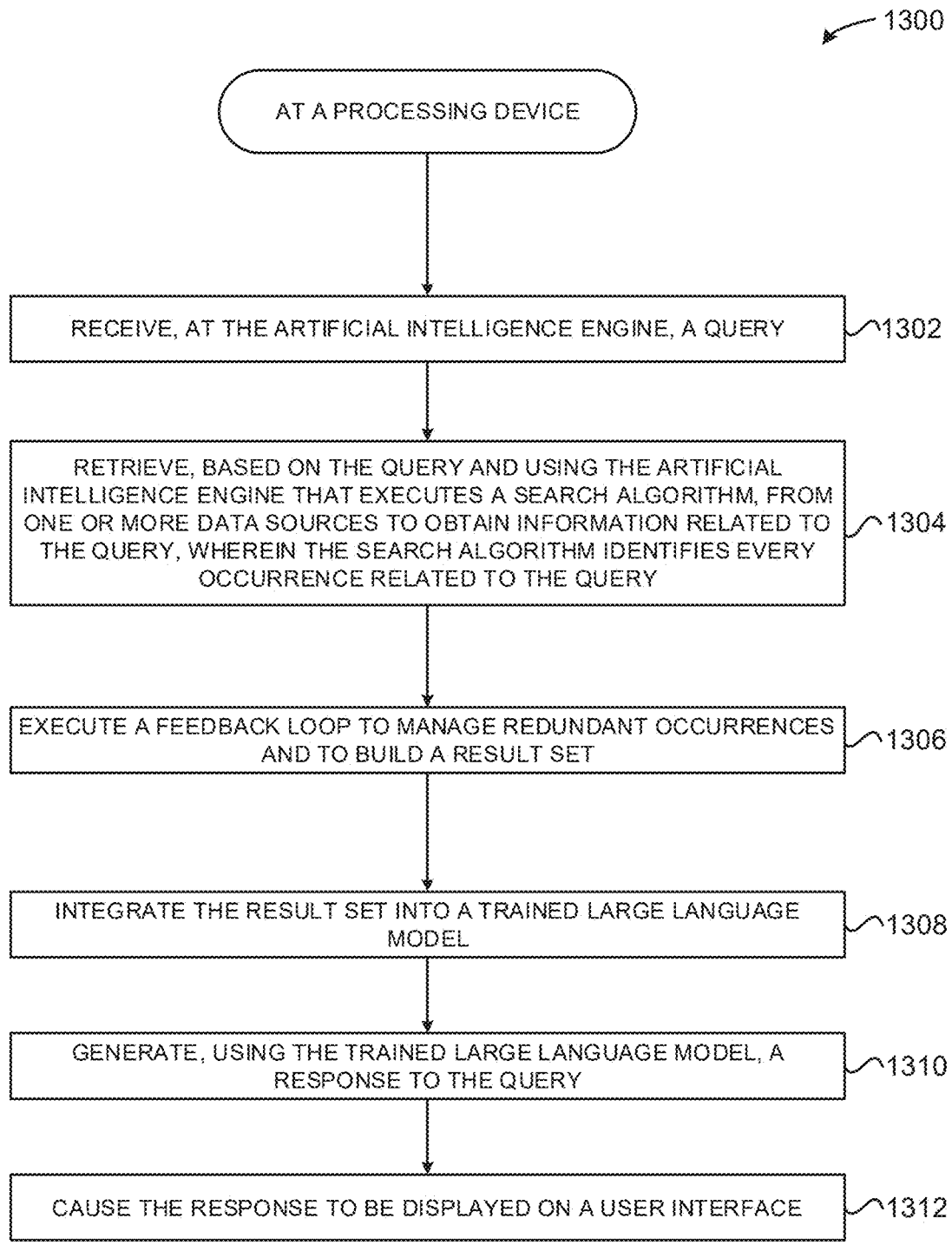
FIG. 13 illustrates an example of a method for using a query to integrate a result set into a large language model generates a response to the query according to certain embodiments of this disclosure.

FIG. 13 illustrates an example of a method 1300 for using a query to integrate a result set into a large language model generates a response to the query according to certain embodiments of this disclosure. The method 1300 may be performed by processing logic that may include hardware (circuitry, dedicated logic, etc.), software, or a combination of both. The method 1300 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1300. The method 1300 may be implemented as computer instructions stored on a memory device and executable by the one or more processors. In certain implementations, the method 1300 may be performed by a single processing thread. Alternatively, the method 1300 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device.

For simplicity of explanation, the method 1300 is depicted and described as a series of operations. However, operations in accordance with this disclosure can occur in various orders or concurrently, and with other operations not presented and described herein. For example, the operations depicted in the method 1300 may occur in combination with any other operation of any other method disclosed herein. Furthermore, not all illustrated operations may be required to implement the method 1300 in accordance with the disclosed subject matter. In addition, those skilled in the art will understand and appreciate that the method 1300 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At block 1302, the processing device may receive, at an artificial intelligence engine, a query.

At block 1304, the processing device may retrieve, based on the query and using the artificial intelligence engine that executes a search algorithm, from one or more data sources to obtain information related to the query.

At block 1306, the processing device may execute a feedback loop to manage redundant occurrences and to build a result set.

At block 1308, the processing device may integrate the result set into a trained large language model.

At block 1310, the processing device may generate, using the trained large language model, a response to the query.

At block 1312, the processing device may cause the response to be displayed on a user interface.

The method 1300 provides a recursively built output sliding window input language model powered deep search executed by the artificial intelligence engine 155. This algorithm allows for finding every instance of text relating to any novel query. Conventional large language model powered search algorithms may involve finding the top K instances of a topic. This is known as Retrieval Augmented Generation (RAG). However, a technical problem exists in that RAG is limited as it tends to miss items of interest and be less comprehensive.

Some embodiments solve this technical problem by providing a technical solution. For example, if a user has numerous documents and desires to search to get "every instance of a thing," such as "find every piece of evidence to support negligence of bob smith." Then, approximately 3 pages of text is presented as a section for the software to examine. First, this is the first 3 pages of the documents being search. In some embodiments, the large language model may be prompted to find any instance of a particular query. The large language model may also be provided (except the first 3 pages) the previously found information, and the large language model may be prompted to omit any redundant data. In some embodiments, the large language model may output anything that it finds relating to the query. The cycle may repeat with the next 3 pages, and so on until all of the document has been searched. Then, a final pass through the large language model is provided the totality of what has been found and instructed again to remove any redundant or unrelated information. The output from the final pass is then output of this algorithm that is implemented in computer instructions stored in a memory device and executed by a processing device.

This algorithm may overcome input length constraints of large language models, allowing arbitrarily large inputs. Further, the disclosed algorithm may be superior to RAG (retrieval augmented generation) systems finding comprehensive instances of searching for information. The quality, consistency, comprehensiveness and correctness may be higher than RAG systems.

This algorithm or method may work in the following way: (i) the following is input to the recursively built output language model deep search executed by the artificial intelligence engine 155: 1) a corpus of documents of arbitrary length is loaded into the system's memory, 2) if not yet converted these documents are converted to a string, referred to as the corpus document string, 3) a results string variable is initiated to an empty string, 4) a slice of the corpus document string may be selected and initialized as a variable known as the corpus document string slice, 5) a feedback loop iteration is initiated, 6) the algorithm within the feedback loop takes the following inputs: a) the query, b) the results string variable, c) the corpus document string slice, 7) a language model may be strategically prompted with the query, results string variable, and corpus document string slice, 8) the language model is directed to search the corpus document string slice and output any novel information relating to the query but not already discovered in the results string variable, 9) the output of the said language model is then appended to the results string variable, 10) the corpus document string slice may be adjusted to start at the end of the previous corpus document string slice, 11) the feedback loop repeats until all text from the corpus document string has been searched, 12) the output is then passed through a filtering step where a language model is configured to remove any redundant information, and 13) the output of step 12 is then returned to the user of the calling programming environment as appropriate. Ultimately, the result may be a comprehensive search result finding every instance of text relating to a particular query.

Figure 14:
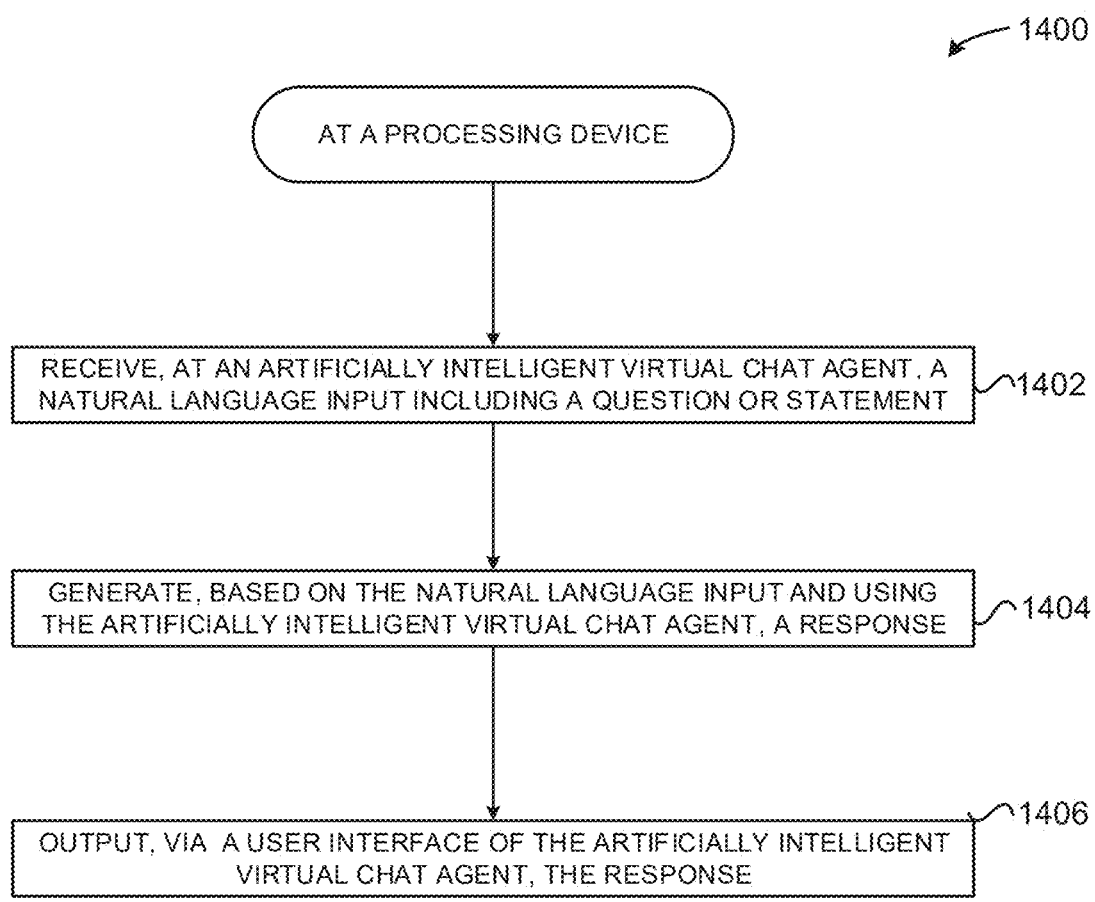
FIG. 14 illustrates an example of a method for using an artificially intelligent virtual chat agent to generate a response to a question or statement according to certain embodiments of this disclosure.

FIG. 14 illustrates an example of a method 1400 for using an artificially intelligent virtual chat agent to generate a response to a question or statement according to certain embodiments of this disclosure. The method 1400 may be performed by processing logic that may include hardware (circuitry, dedicated logic, etc.), software, or a combination of both. The method 1400 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1400. The method 1400 may be implemented as computer instructions stored on a memory device and executable by the one or more processors. In certain implementations, the method 1400 may be performed by a single processing thread. Alternatively, the method 1400 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device.

For simplicity of explanation, the method 1400 is depicted and described as a series of operations. However, operations in accordance with this disclosure can occur in various orders or concurrently, and with other operations not presented and described herein. For example, the operations depicted in the method 1400 may occur in combination with any other operation of any other method disclosed herein. Furthermore, not all illustrated operations may be required to implement the method 1400 in accordance with the disclosed subject matter. In addition, those skilled in the art will understand and appreciate that the method 1400 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At block 1402, the processing device may receive, at an artificially intelligent virtual chat agent, a natural language input including a question or statement.

At block 1404, the processing device may generate, based on the natural language input and using the artificially intelligent virtual chat agent, a response.

At block 1406, the processing device may output, via a user interface of the artificially intelligent virtual chat agent, the response.

In some embodiments, the method 1400 may provide virtual chatting with a user that is legal context-aware that maintains coherence throughout long and complex legal discussions. Further, some embodiments may provide artificial intelligent enhanced legal insight extract. Through a document insights search engine (implemented in computer instructions stored on a memory device and executed by a processing device) provided as part of the artificial intelligent engine 155, the software may process and make large volumes of legal documents searchable, providing users with the ability to quickly find specific information and gain insights. This may be implemented by artificial intelligent preprocessing techniques that categorize and highlight relevant data points based on user queries.

This feature of the software may enable a user to chat with an artificially intelligent virtual chat agent that has a dynamic library of information that is rotated into context based on the course of the conversation. The library presented to the prompt of the artificially intelligent virtual chat agent may be changed upon every generation using a strategic retrieval system.

In some embodiments, semantic embeddings drive one of the key steps. A semantic embedding may refer to a dense vector representation of a word, phrase, sentence, or other textual unit in a continuous vector space, such that the semantic relationships and meanings are captured by the relative positions of the vectors. Specifically with these characteristics: (i) vector representation: each linguistic unit is mapped to a fixed-dimensional vector of real numbers, (ii) semantic preservation: the embedding space is structured so that semantically similar items are located closer to each other in the vector space, (iii) dimensionality: typically high-dimensional (e.g., 100 to 2000 dimensions), allowing for rich representation of semantic nuances, (iv) learned representation: often derived through machine learning techniques applied to large corpora of text, capturing contextual and distributional information, (v) algebraic operations: supports meaningful vector operations (e.g., addition, subtraction) that often correspond to semantic relationships, (vi) continuous space: allows for smooth transitions between concepts and enables measurement of semantic similarity through vector distance metrics, (vii) transfer learning: can be used as input features for various natural language processing tasks, facilitating transfer of semantic knowledge. Key applications may include but are not limited to: information retrieval, document classification, sentiment analysis, machine translation, and as input features for more complex natural language understanding tasks.

Depending on the flow of the conversation the input of the user, or another series of assumed questions, determined by a specialized language model middleware, are embedded via one or more machine learning models. These embeddings are then compared mathematically via cosine similarity. Then the top K, (K determined by the context of generation) most similar texts associated with the strategic query are presented to the generative context.

In some embodiments, the result is a chat system that is continually context aware and able to search precisely for what sections of large corpuses of documents are appropriate to cite or be aware of while responding to a user's queries.

In some embodiments, the artificial intelligence engine 155 may perform deep artificial intelligent enhanced legal insight extraction. This insight extraction feature may include a unique configuration that allows for a document library to be searched more deeply. This deep artificial intelligent enhanced legal insight extraction feature has the following characteristics: (i) it may be an extension of the context-aware feedback loop. The context-aware feedback loop not only has its output fed back into itself recursively, but the input may be paginated strategically, also known as a sliding window algorithm.

This sliding window of input in conjunction with a build-up of searched knowledge input, may enable for a uniquely powerful and useful recursive language model powered search functionality executed by the artificial intelligent engine 155. The result may be the ability for a user to input a query and the software may find every instance of text that is sufficiently semantically linked to the user's query. Further, the result of this sequence may be fed into the context-aware feedback loop discussed herein to be coherent, non-redundant and formatted.

Figure 15:
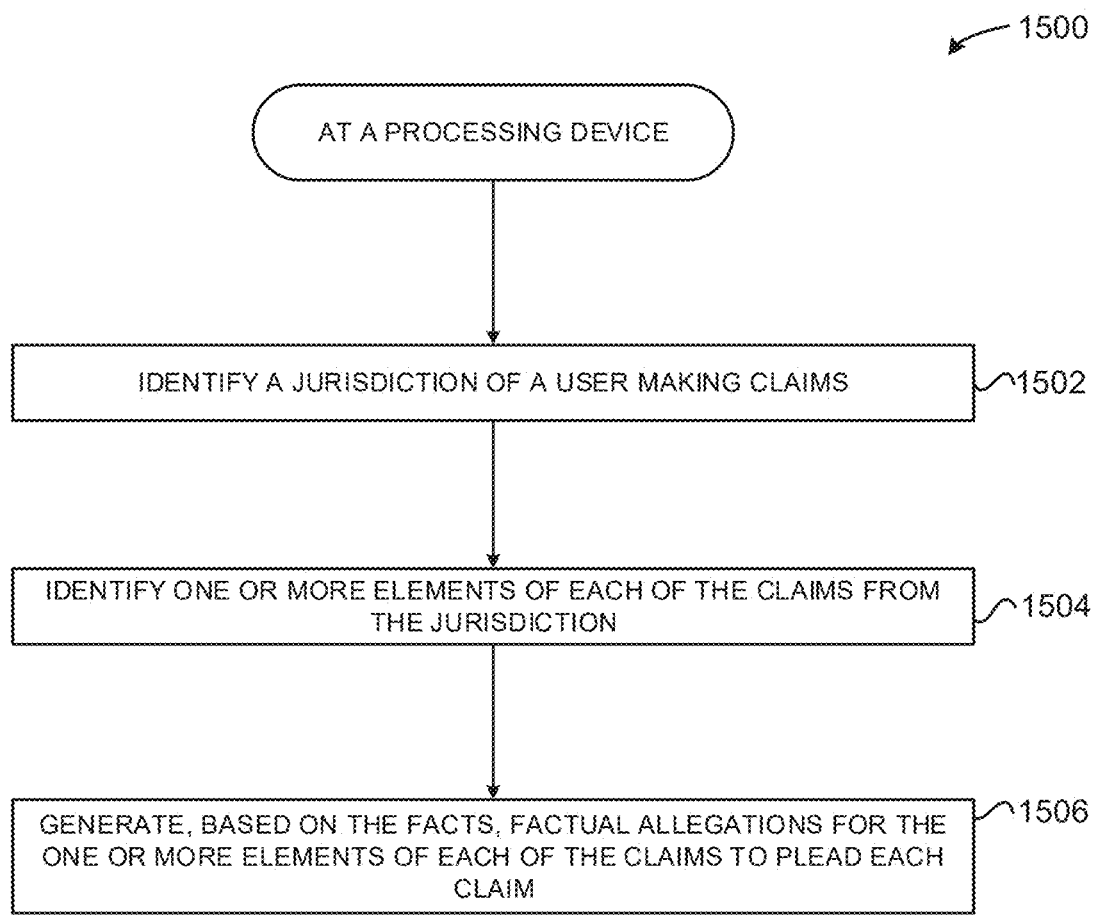
FIG. 15 illustrates an example of a method for identifying a jurisdiction, identifying elements of a claim, and generating factual allegations using an artificial intelligent engine according to certain embodiments of this disclosure.

FIG. 15 illustrates an example of a method 1500 for identifying a jurisdiction, identifying elements of a claim, and generating factual allegations using an artificial intelligent engine according to certain embodiments of this disclosure. The method 1500 may be performed by processing logic that may include hardware (circuitry, dedicated logic, etc.), software, or a combination of both. The method 1500 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1500. The method 1500 may be implemented as computer instructions stored on a memory device and executable by the one or more processors. In certain implementations, the method 1500 may be performed by a single processing thread. Alternatively, the method 1500 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device.

For simplicity of explanation, the method 1500 is depicted and described as a series of operations. However, operations in accordance with this disclosure can occur in various orders or concurrently, and with other operations not presented and described herein. For example, the operations depicted in the method 1500 may occur in combination with any other operation of any other method disclosed herein. Furthermore, not all illustrated operations may be required to implement the method 1500 in accordance with the disclosed subject matter. In addition, those skilled in the art will understand and appreciate that the method 1500 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

In some embodiments, the unstructured input data may include case details including party names, facts, claims, or some combination thereof. In some embodiments, the artificial intelligent engine may generate the document according to blocks 1502, 1504, and 1506 as discussed below.

At block 1502, the processing device may identify a jurisdiction of a user making the claims.

At block 1504, the processing device may identify one or more elements of each of the claims from the jurisdiction.

At block 1506, the processing device may generate, based on the facts, factual allegations for the one or more elements of each of the claims to plead each claim.

Figure 16:
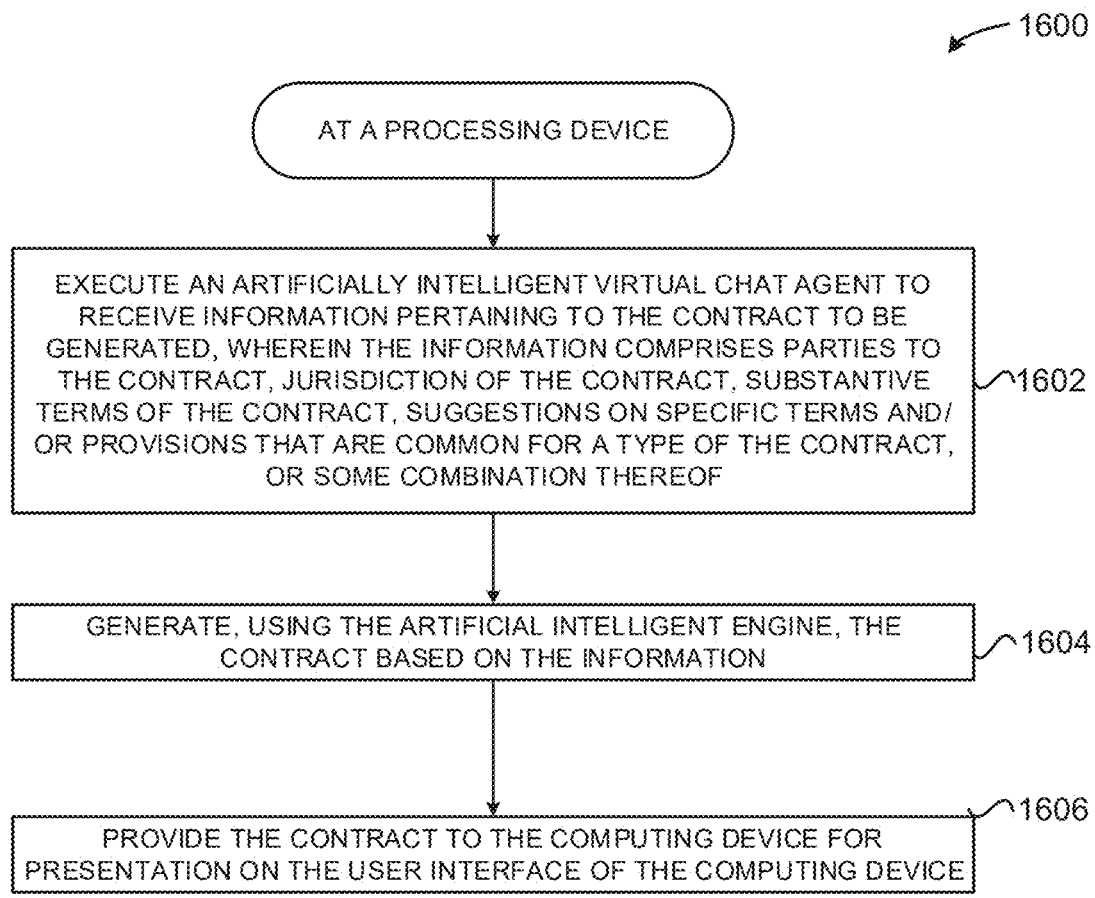
FIG. 16 illustrates an example of a method for using an artificial intelligent engine to draft a contract according to certain embodiments of this disclosure.

FIG. 16 illustrates an example of a method 1600 for using an artificial intelligent engine to draft a contract according to certain embodiments of this disclosure. The method 1600 may be performed by processing logic that may include hardware (circuitry, dedicated logic, etc.), software, or a combination of both. The method 1600 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1600. The method 1600 may be implemented as computer instructions stored on a memory device and executable by the one or more processors. In certain implementations, the method 1600 may be performed by a single processing thread. Alternatively, the method 1600 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device.

For simplicity of explanation, the method 1600 is depicted and described as a series of operations. However, operations in accordance with this disclosure can occur in various orders or concurrently, and with other operations not presented and described herein. For example, the operations depicted in the method 1600 may occur in combination with any other operation of any other method disclosed herein. Furthermore, not all illustrated operations may be required to implement the method 1600 in accordance with the disclosed subject matter. In addition, those skilled in the art will understand and appreciate that the method 1600 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

In some embodiments, the document may include a contract.

At block 1602, the processing device may execute an artificially intelligent virtual chat agent to receive information pertaining to the contract to be generated. The information may include parties to the contract, jurisdiction of the contract, substantive terms of the contract, suggestions on specific terms and/or provisions that are common for a type of the contract, or some combination thereof.

At block 1604, the processing device may generate, using the artificial intelligent engine, the contract based on the information.

At block 1606, the processing device may provide the contract to the computing device for presentation on the user interface of the computing device.

Figure 17:
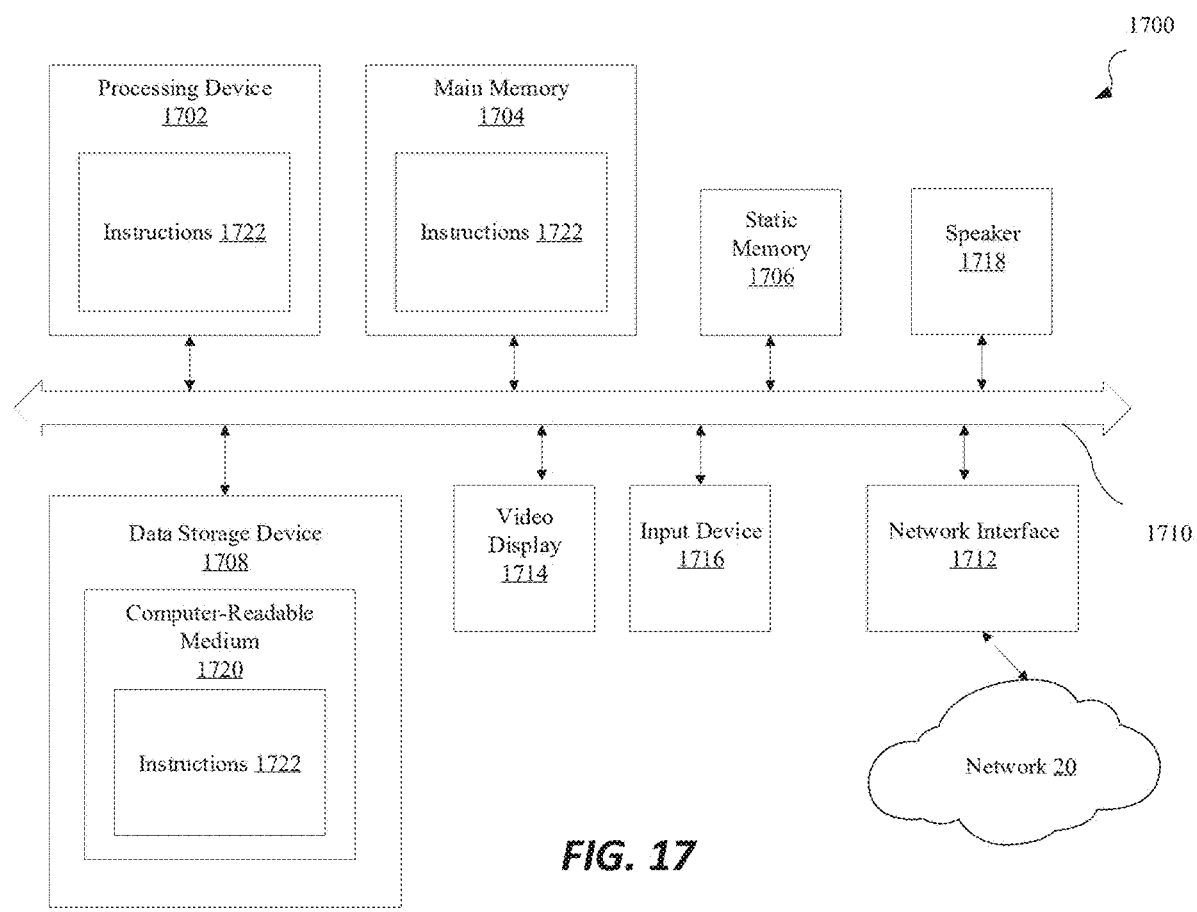
FIG. 17 illustrates an example computer system according to embodiments of this disclosure.

FIG. 17 illustrates an example computer system 1700, which can perform any one or more of the methods described herein. In one example, computer system 1700 may include one or more components that correspond to the computing device 12, one or more servers 128 of the cloud-based computing system 116, one or more artificial intelligence engines 155 of the cloud-based computing system 116, or one or more training engines 152 of the cloud-based computing system 116 of FIG. 1. The computer system 1700 may be connected (e.g., networked) to other computer systems in a LAN, an intranet, an extranet, or the Internet. The computer system 1700 may operate in the capacity of a server in a client-server network environment. The computer system 1700 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1700 includes a processing device 1702, a main memory 1704 (e.g., read-only memory (ROM), solid state drive (SSD), flash memory, dynamic random access memory (DRAM) such as synchronous DRAM (SDRAM)), a static memory 1706 (e.g., solid state drive (SSD), flash memory, static random access memory (SRAM)), and a data storage device 1708, which communicate with each other via a bus 1710.

Processing device 1702 represents one or more general-purpose processing devices such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1702 may also be one or more special-purpose processing devices such as an application specific integrated circuit (ASIC), a field programmable gate array (FPGA), a digital signal processor (DSP), network processor, or the like. The processing device 1702 is configured to execute instructions for performing any of the operations and steps of any of the methods discussed herein.

The computer system 1700 may further include a network interface device 1712. The computer system 1700 also may include a video display 1714 (e.g., a liquid crystal display (LCD) or a cathode ray tube (CRT)), one or more input devices 1716 (e.g., a keyboard and/or a mouse), and one or more speakers 1718 (e.g., a speaker). In one illustrative example, the video display 1714 and the input device(s) 1716 may be combined into a single component or device (e.g., an LCD touch screen).

The data storage device 1716 may include a computer-readable medium 1720 on which the instructions 1722 embodying any one or more of the methodologies or functions described herein are stored. The instructions 1722 may also reside, completely or at least partially, within the main memory 1704 and/or within the processing device 1702 during execution thereof by the computer system 1700. As such, the main memory 1704 and the processing device 1702 also constitute computer-readable media. The instructions 1722 may further be transmitted or received over a network 20 via the network interface device 1712.

While the computer-readable storage medium 1720 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Additional details related to the disclosed techniques will not be described below.

In some embodiments, another method of the disclosed techniques may be performed by any of the components of FIG. 1. This method may be implemented in computer instructions stored on one or more memory devices and executed by one or more processing devices engine may include the steps of (i) receiving a tool or feature of software from the user interface 160, (ii) receiving input information tool specific inputs including document(s) upload, (iii) inputting the documents into the artificial intelligence engine 155, wherein the documents are parsed and injected into the appropriate prompts and configurations, (iv) a large language model generation is initiated serially and in parallel, wherein generations are tracked and fed back into the context-aware feedback loop, (v) reassemble outputs, (vi) use outputs with a final context-aware feedback loop to achieve maximum coherence and consistent formatting, (vii) output from final context-aware feedback loop is converted to a structured document file and provide via the user interface 160, (viii) download the document file to a computing device of the user, email the document to an email address of the user, print the document file to a printer, or some combination thereof.

Various databases may be used by some of the disclosed embodiments, for example: a user metadata database, uploaded documents database, context database used for storing intermediate structured/unstructured values, and generated document database used for storing intermediate or final long document outputs.

Various modules, features, and/or tools may also be used by some of the disclosed embodiments, each of these modules, features, and/or tools may be implemented in computer instructions stored on one or more memory devices and executed by one or more processing devices. For example, a document input and preprocessing module may manage the upload and initial processing of unstructured legal documents and text data, and prepare them for further analysis and transformation into structured data.

An artificial intelligence processing and generation module may utilize advanced artificial intelligence models, such as large language models, to process structured data and generate legal documents such as complaints, answers, and discovery responses.

A communication module may perform data transmission between the software's internal modules, the user interfaces, and external systems like legal databases or cloud storage services.

A display module may manage the display of user interfaces, including document editing tools, search interfaces, and results presentation, facilitating user interaction with the software.

A legal insights and search engine may process large volumes of uploaded documents to make them searchable and extract insights using artificial intelligence driven search and data analysis techniques.

A feedback and learning module may integrate user feedback and corrections into the system, enabling continuous learning and adaptation of the artificial intelligence models to user preferences and legal standards.

A document formatting and export engine may convert artificial intelligence generated text into standard legal formats (e.g., docx), ensuring that documents are ready for download and use in legal proceedings.

A legal analysis tools module may include specialized tools like a lawsuit analyzer and claims and damages identifier, which uses the artificial intelligence engine 155 to provide strategic legal advice based on historical data and legal precedents.

A system management and security engine may manage system operations including security protocols, data integrity checks, and user authentication, ensuring the system's reliability and safety.

A database engine may manage the storage, retrieval, and management of data across the software, including user data, document data, and historical legal cases.

Various users may engage and use the software disclosed herein. The users may include legal professionals (attorneys, paralegals, etc.), who may be the primary users interacting with nearly all modules for drafting, researching, and managing legal documents. Other users may include legal researchers and analysts, who may engage primarily with the Legal Insights and Search Engine, Document Input and Preprocessing Module, and Legal Analysis Tools Module for conducting deep legal research and analysis. Other users may include IT and system administrators who may interact with the System Management and Security Engine and Database Engine to ensure the system operates smoothly and securely. Other users may include clients and external users who may interact with simplified user interfaces managed by the Display Module to view documents or receive reports generated by the software. Other users may include pro se/pro per litigants who may be users interacting with nearly all modules for drafting, researching, and managing legal documents for litigation In some embodiments, the artificial intelligence engine 155 may execute a lawsuit analyzer feature implemented in computer instructions. The lawsuit analyzer feature may use artificial intelligence to evaluate the strengths and weaknesses of a case based on historical data and current legal standards. For example, lawyers may input case details, and the software assesses these against a vast database of legal outcomes to provide predictions on possible results of a motion to dismiss for failure to state a claim, aiding in strategic decision-making. The lawsuit analyzer may ingest a complaint, identifying claims alleged, and locates elements for those claims in the jurisdiction identified in the complaint. The artificial intelligence engine 155 may state the claims for the user, states the elements for the user with an explanation as to what it means in plain English, and identifies the facts (if any) in the complaint that are alleged which appear to support that claim. The artificial intelligence engine 155 may indicate whether a motion to dismiss for failing to state a claim is available to the user. Further, the user interface 160 may present a history section where prior runs can be recalled and run again.

In some embodiments, the artificial intelligence engine 155 may execute a document insights search engine, which leverages an artificially intelligent virtual chat agent to enable a user to interact with the system. In some embodiments, the software enables users to upload and search through large volumes of documents to uncover vital legal information and insights. For example, legal professionals upload documents to the platform, which processes and indexes them for quick retrieval. Users may then query the system for specific information, receiving curated excerpts and insights directly related to their search terms. In some embodiments, the software can pinpoint and extra exact list data, or provide the ability to "chat" with the documents to ask questions, locate information, or suggest course of action.

In some embodiments, the artificial intelligence engine 155 may execute an identify claims & boost damages tool.

In some embodiments, the artificial intelligence engine 155 may identify potential claims and calculates optimal damages based on the factual context provided. The artificial intelligence engine 155 may also suggest a certain number of questions to ask the client in attempt to add claims or boost damages. For example, users input detailed case facts, and the software analyzes this information to pinpoint potential legal claims and suggest optimal damages calculations, thereby supporting the preparation of damage assertions in litigation.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

CLAUSES

1. A computer-implemented method comprising:
receiving unstructured input data;
transforming the unstructured input data into structured data, wherein the transforming is performed using a large language model and a parsing algorithm configured for the unstructured input data;
generating, based on the structured data, one or more outputs configured to be processed by an artificial intelligence engine;
generating, using the artificial intelligence engine, a document by converting the one or more outputs from a first format to a second format, wherein the artificial intelligence engine is configured to generate the document by executing a plurality of functions in parallel to reduce execution time of a processing device; and
providing the document to a computing device for presentation on a user interface of the computing device.

2. The computer-implemented method of any clause herein, further comprising generating, based on the one or more outputs and using the artificial intelligence engine, one or more insights.

3. The computer-implemented method of any clause herein, further comprising generating, based on the one or more outputs and using an artificial intelligence engine, one or more recommendations.

4. The computer-implemented method of any clause herein, further comprising:
receiving, at the artificial intelligence engine, a query;
retrieving, based on the query and using the artificial intelligence engine that executes a search algorithm, from one or more data sources to obtain information related to the query, wherein the search algorithm identifies every occurrence related to the query;
executing a feedback loop to manage redundant occurrences and to build a result set;
integrating the result set into a trained large language model;
generating, using the trained large language model, a response to the query; and
causing the response to be displayed on a user interface.

5. The computer-implemented method of any clause herein, further comprising:
receiving, at an artificially intelligent virtual chat agent, a natural language input comprising a question or statement;
generating, based on the natural language input and using the artificially intelligent virtual chat agent, a response; and
outputting, via a user interface of the artificially intelligent virtual chat agent, the response.

6. The computer-implemented method of any clause herein, wherein the unstructured input data comprises case details comprising party names, facts, claims, or some combination thereof, and the artificial intelligent engine generates the document by:
identifying a jurisdiction of a user making the claims,
identifying one or more elements of each of the claims from the jurisdiction;
generating, based on the facts, factual allegations for the one or more elements of each of the claims to plead each claim.

7. The computer-implemented method of any clause herein, wherein the document comprises a lawsuit and the second format comprises:
a court and party heading,
a name of the document,
a jury demand,
an introductory statement comprising an innocence of the user, a wrongdoing of a defendant, a notice to the defendant that injury would occur, an example of the defendant's repetitive wrongdoing, or some combination thereof,
a general allegation section presented in chronological order outlining a story of a user,
one or more claims or causes of action each presented under its own heading that presents respective facts for each element of the one or more claims,
an integration clause at a beginning of each of the one or more claims,
a demand section preformatted and customized to the user's facts,
a closing jury demand and signature section for the user and the user's counsel, or
some combination thereof.

8. The computer-implemented method of any clause herein, wherein the document comprises an answer for a lawsuit and the artificial intelligent engine generates the answer based on a complaint, and the second format comprises denying one or more allegations associated with the complaint, further wherein:

the artificial intelligent engine parses each paragraph of the one or more allegations into separate and distinct parts, and responds appropriately to each part based on facts, and the artificial intelligent engine determines defensive doctrines from the facts and includes those defensive doctrines as defenses and affirmative defenses.

9. The computer-implemented method of any clause herein, wherein the document comprises an answer to a lawsuit and the second format comprises:
   a court and party heading,
   a name of the document,
   a jury demand,
   an introductory statement comprising an a wrongdoing of a plaintiff, a defendant's positives to present an emotionally compelling defense, or some combination thereof,
   one or more responses that is appropriate to each allegation,
   one or more relevant defenses and affirmative defenses,
   an integration clause at a start of each claim,
   a demand section preformatted and customized to facts and associating those facts with facts normally alleged with the lawsuit and including defensive doctrines from the facts,
   a closing jury demand and signature for defendant's counsel,
   a certificate of service with the plaintiff's counsels contact information entered by a complaint, or
   some combination thereof.

10. The computer-implemented method of any clause herein, wherein the document comprises a discovery response and the artificial intelligent engine generates the discovery response based on one or more discovery requests, and the second format comprises legal objections and responses based on a client's data and case facts, further wherein:
   the artificial intelligent engine restates, in the discovery response, each of the one or more discovery requests and provides each objection that is applicable, and
   the artificial intelligent engine responds, in the discovery response, to each of the one or more requests using factual information.

11. The computer-implemented method of any clause herein, further comprising presenting the discovery response in a user interface that enables editing the discovery response in real-time or near real-time.

12. The computer-implemented method of any clause herein, wherein the document comprises a contract and the computer-implemented method further comprises:
   executing an artificially intelligent virtual chat agent to receive information pertaining to the contract to be generated, wherein the information comprises parties to the contract, jurisdiction of the contract, substantive terms of the contract, suggestions on specific terms and/or provisions that are common for a type of the contract, or some combination thereof;
   generating, using the artificial intelligent engine, the contract based on the information; and
   providing the contract to the computing device for presentation on the user interface of the computing device.

13. The computer-implemented method of any clause herein, wherein the document comprises a summary of a medical record and the unstructured input data comprises one or more medical files, doctor records, hospital invoices, a police report, or some combination thereof, and the computer-implemented method further comprises:
   generating, using the artificial intelligence engine, one or more lists of costs and providers by parsing the unstructured input data into one or more parts and reading line by line in order to extract data associated with the one or more lists of costs and providers, wherein the second format comprises:
   a primary injury,
   one or more potential causes of the primary injury,
   a physical impact to a plaintiff,
   a psychological impact to the plaintiff,
   a recovery timeframe for the plaintiff,
   one or more medical treatments and their effectiveness,
   one or more ways the primary injury impacts a quality of life of the plaintiff,
   one or more medically significant events,
   a summary of opinions or prognostic information,
   a recovery trajectory or permanent limitation of the plaintiff,
   a preexisting condition or distinct injury of the plaintiff,
   itemized costs comprising location and provider, specific item, cost per item, and
   a total cost per location,
   a medical providers list,
   one or more potentially missing documents,
   one or more arguments for the plaintiff,
   one or more arguments for a defendant, or
   some combination thereof.

14. The computer-implemented method of any clause herein, wherein the document comprises a summary of a transcript and the unstructured input data comprises a court or deposition transcript, wherein the computer-implemented method further comprises:
   analyzing the unstructured input data and extracting and summarizing key information, wherein the second format comprises:
   an executive summary,
   one or more key takeaways from a deposition,
   a witness reliability analysis,
   a deponent background,
   deponent preparation,
   testimony relevant to case claims element by element with witness statements with citations to a page and paragraph added under each element,
   testimony relevant to the defense with witness statements with citations to a page and paragraph added under each relevant defense,
   testimony with inconsistent statement,
   ideas for production requests,
   ideas for further investigation, or
   some combination thereof 15. The computer-implemented method of any clause herein, wherein the document comprises a legal complaint, a legal answer, a discovery response, a summary of a transcript, a summary of a medical record, or some combination thereof.

16. The computer-implemented method of any clause herein, wherein the document is generated without user interaction.

17. The computer-implemented method of any clause herein, wherein the document is a legal document.

18. The computer-implemented method of any clause herein, further comprising:
   receiving a second document;
   generating, via the artificial intelligence engine using the second document as a template, a third document that includes one or more facts from a new matter.

19. A tangible, non-transitory computer-readable medium storing instructions that, when executed, cause one or more processing devices to:
- receive unstructured input data;
- transform the unstructured input data into structured data, wherein the transforming is performed using a large language model and a parsing algorithm configured for the unstructured input data;
- generate, based on the structured data, one or more outputs configured to be processed by an artificial intelligence engine;
- generate, using the artificial intelligence engine, a document by converting the one or more outputs from a first format to a second format, wherein the artificial intelligence engine is configured to generate the document by executing a plurality of functions in parallel to reduce execution time of a processing device; and
- provide the document to a computing device for presentation on a user interface of the computing device.

20. A system comprising:
- one or more memory devices storing instructions; and
- one or more processing devices communicatively coupled to the one or more memory devices, wherein the one or more processing devices execute the instructions to:
- receive unstructured input data;
- transform the unstructured input data into structured data, wherein the transforming is performed using a large language model and a parsing algorithm configured for the unstructured input data;
- generate, based on the structured data, one or more outputs configured to be processed by an artificial intelligence engine;
- generate, using the artificial intelligence engine, a document by converting the one or more outputs from a first format to a second format, wherein the artificial intelligence engine is configured to generate the document by executing a plurality of functions in parallel to reduce execution time of a processing device; and
- provide the document to a computing device for presentation on a user interface of the computing device.

The invention claimed is:

1. A computer-implemented method comprising:
- receiving unstructured input data;
- transforming the unstructured input data into structured data, wherein the transforming is performed using a large language model and a parsing algorithm configured for the unstructured input data;
- generating, based on the structured data, one or more outputs configured to be processed by an artificial intelligence engine;
- generating, using the artificial intelligence engine, a document by converting the one or more outputs from a first format to a second format, wherein generating the document includes executing a plurality of functions in parallel to reduce execution time of a processing device
- in response to detecting that generation of the document stopped, executing a context-aware feedback loop using a prompt that detects a reason why the generation of the document stopped;
- in response to detecting that the generation of the document stopped due to the generation of the document by the large language model being complete, providing the document to a computing device for presentation on a user interface of the computing device; and
- in response to detecting that the generation of the document stopped due to an output constraint of the large language model, re-executing the prompt with a partially-generated document string.

2. The computer-implemented method of claim 1, further comprising generating, based on the one or more outputs and using the artificial intelligence engine, one or more insights.

3. The computer-implemented method of claim 1, further comprising generating, based on the one or more outputs and using the artificial intelligence engine, one or more recommendations.

4. The computer-implemented method of claim 1, further comprising: receiving, at the artificial intelligence engine, a query;
- retrieving, based on the query and using the artificial intelligence engine that executes a search algorithm, from one or more data sources to obtain information related to the query, wherein the search algorithm identifies every occurrence related to the query;
- executing a feedback loop to manage redundant occurrences and to build a result set; integrating the result set into a trained large language model;
- generating, using the trained large language model, a response to the query; and causing the response to be displayed on a user interface.

5. The computer-implemented method of claim 1, further comprising:
- receiving, at an artificially intelligent virtual chat agent, a natural language input comprising a question or statement;
- generating, based on the natural language input and using the artificially intelligent virtual chat agent, a response; and
- outputting, via a user interface of the artificially intelligent virtual chat agent, the response.

6. The computer-implemented method of claim 1, wherein the unstructured input data comprises case details comprising party names, facts, claims, or some combination thereof, and the artificial intelligent engine generates the document by:
- identifying a jurisdiction of a user making the claims,
- identifying one or more elements of each of the claims from the jurisdiction;
- generating, based on the facts, factual allegations for the one or more elements of each of the claims to plead each claim.

7. The computer-implemented method of claim 1, wherein the document comprises a lawsuit and the second format comprises:
- a court and party heading,
- a name of the document,
- a jury demand,
- an introductory statement comprising an innocence of the user, a wrongdoing of a defendant, a notice to the defendant that injury would occur, an example of the defendant's repetitive wrongdoing, or some combination thereof,
- a general allegation section presented in chronological order outlining a story of a user,
- one or more claims or causes of action each presented under its own heading that presents respective facts for each element of the one or more claims,
- an integration clause at a beginning of each of the one or more claims, a demand section preformatted and customized to the user's facts,
- a closing jury demand and signature section for the user and the user's counsel, or some combination thereof.

8. The computer-implemented method of claim 1, wherein the document comprises an answer for a lawsuit and the artificial intelligence engine generates the answer based on a complaint, and the second format comprises denying one or more allegations associated with the complaint, further wherein:
  the artificial intelligent engine parses each paragraph of the one or more allegations into separate and distinct parts, and responds appropriately to each part based on facts, and
  the artificial intelligent engine determines defensive doctrines from the facts and includes those defensive doctrines as defenses and affirmative defenses.

9. The computer-implemented method of claim 1, wherein the document comprises an answer to a lawsuit and the second format comprises:
  a court and party heading,
  a name of the document,
  a jury demand,
  an introductory statement comprising an a wrongdoing of a plaintiff, a defendant's positives to present an emotionally compelling defense, or some combination thereof,
  one or more responses that is appropriate to each allegation,
  one or more relevant defenses and affirmative defenses,
  an integration clause at a start of each claim,
  a demand section preformatted and customized to facts and associating those facts with facts normally alleged with the lawsuit and including defensive doctrines from the facts,
  a closing jury demand and signature for defendant's counsel,
  a certificate of service with the plaintiff's counsels contact information entered by a complaint, or
  some combination thereof.

10. The computer-implemented method of claim 1, wherein the document comprises a discovery response and the artificial intelligent engine generates the discovery response based on one or more discovery requests, and the second format comprises legal objections and responses based on a client's data and case facts, further wherein:
  the artificial intelligent engine restates, in the discovery response, each of the one or more discovery requests and provides each objection that is applicable, and
  the artificial intelligent engine responds, in the discovery response, to each of the one or more requests using factual information.

11. The computer-implemented method of claim 10, further comprising presenting the discovery response in a user interface that enables editing the discovery response in real-time or near real-time.

12. The computer-implemented method of claim 1, wherein the document comprises a contract and the computer-implemented method further comprises:
  executing an artificially intelligent virtual chat agent to receive information pertaining to the contract to be generated, wherein the information comprises parties to the contract, jurisdiction of the contract, substantive terms of the contract, suggestions on specific terms and/or provisions that are common for a type of the contract, or some combination thereof,
  generating, using the artificial intelligent engine, the contract based on the information; and providing the contract to the computing device for presentation on the user interface of the computing device.

13. The computer-implemented method of claim 1, wherein the document comprises a summary of a medical record and the unstructured input data comprises one or more medical files, doctor records, hospital invoices, a police report, or some combination thereof, and the computer-implemented method further comprises:
  generating, using the artificial intelligence engine, one or more lists of costs and providers by parsing the unstructured input data into one or more parts and reading line by line in order to extract data associated with the one or more lists of costs and providers, wherein the second format comprises:
  a primary injury,
  one or more potential causes of the primary injury, a physical impact to a plaintiff,
  a psychological impact to the plaintiff, a recovery timeframe for the plaintiff,
  one or more medical treatments and their effectiveness,
  one or more ways the primary injury impacts a quality of life of the plaintiff, one or more medically significant events,
  a summary of opinions or prognostic information,
  a recovery trajectory or permanent limitation of the plaintiff,
  a preexisting condition or distinct injury of the plaintiff,
  itemized costs comprising location and provider, specific item, cost per item, and a total cost per location,
  a medical providers list,
  one or more potentially missing documents,
  one or more arguments for the plaintiff,
  one or more arguments for a defendant,
  or some combination thereof.

14. The computer-implemented method of claim 1, wherein the document comprises a summary of a transcript and the unstructured input data comprises a court or deposition transcript, wherein the computer-implemented method further comprises:
  analyzing the unstructured input data and extracting and summarizing key information, wherein the second format comprises:
  an executive summary,
  one or more key takeaways from a deposition,
  a witness reliability analysis,
  a deponent background,
  deponent preparation,
  testimony relevant to case claims element by element with witness statements with citations to a page and paragraph added under each element,
  testimony relevant to the defense with witness statements with citations to a page and paragraph added under each relevant defense,
  testimony with inconsistent statement,
  ideas for production requests,
  ideas for further investigation, or
  some combination thereof.

15. The computer-implemented method of claim 1, wherein the document comprises a legal complaint, a legal answer, a discovery response, a summary of a transcript, a summary of a medical record, or some combination thereof.

16. The computer-implemented method of claim 1, wherein the document is generated without user interaction.

17. The computer-implemented method of claim 1, wherein the document is a legal document.

18. The computer-implemented method of claim 1, further comprising:
  receiving a second document;
  generating, via the artificial intelligence engine using the second document as a template, a third document that includes one or more facts from a new matter.

19. A tangible, non-transitory computer-readable medium storing instructions that, when executed, cause one or more processing devices to:
- receive unstructured input data;
- transform the unstructured input data into structured data, wherein the transforming is performed using a large language model and a parsing algorithm configured for the unstructured input data;
- generate, based on the structured data, one or more outputs configured to be processed by an artificial intelligence engine;
- generate, using the artificial intelligence engine, a document by converting the one or more outputs from a first format to a second format, wherein generating the document includes executing a plurality of functions in parallel to reduce execution time of a processing device
- in response to detecting that generation of the document stopped, execute a context-aware feedback loop using a prompt that detects a reason why the generation of the document stopped;
- in response to detecting that the generation of the document stopped due to the generation of the document by the large language model being complete, provide the document to a computing device for presentation on a user interface of the computing device; and
- in response to detecting that the generation of the document stopped due to an output constraint of the large language model, re-execute the prompt with a partially-generated document string.

20. A computer-implemented system comprising:
- one or more memory devices storing instructions; and
- one or more hardware processing devices communicatively coupled to the one or more memory devices, wherein the one or more hardware processing devices execute the instructions to:
- receive unstructured input data;
- transform the unstructured input data into structured data, wherein the transforming is performed using a large language model and a parsing algorithm configured for the unstructured input data;
- generate, based on the structured data, one or more outputs configured to be processed by an artificial intelligence engine;
- generate, using the artificial intelligence engine, a document by converting the one or more outputs from a first format to a second format, wherein the artificial intelligence engine is configured to generate the document by executing a plurality of functions in parallel to reduce execution time of a processing device, and wherein the artificial intelligence engine is further configured to
- in response to detecting that the generation of the document stopped, execute a context-aware feedback loop that uses a prompt that detects a reason why generation of the document stopped;
- in response to detecting that the generation of the document stopped due to the generation of the document by the large language model being complete, provide the document to a computing device for presentation on a user interface of the computing device; and
- in response to detecting that the generation of the document stopped due to an output constraint of the large language model, re-execute the prompt with a partially-generated document string.

* * * * *